(12) United States Patent
Gum et al.

(10) Patent No.: US 8,812,030 B2
(45) Date of Patent: Aug. 19, 2014

(54) SENSING RELATIVE POSITION FROM A WIRELESS TRANSCEIVER

(75) Inventors: Arnold Jason Gum, San Diego, CA (US); Lionel J. Garin, Palo Alto, CA (US); Leonid Sheynblat, Hillsborough, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 12/841,936

(22) Filed: Jul. 22, 2010

(65) Prior Publication Data

US 2012/0021758 A1 Jan. 26, 2012

(51) Int. Cl.
*H04W 24/00* (2009.01)

(52) U.S. Cl.
USPC .......... 455/456.6; 455/404.2; 455/456.2; 455/456.3; 455/456.5; 370/328; 340/995.28; 342/450

(58) Field of Classification Search
USPC ........ 455/456.1–456.6, 404.2, 423–425, 434, 455/456.1–457; 370/328–338; 340/958–996; 342/450–456
See application file for complete search history.

(56) References Cited

U.S. PATENT DOCUMENTS

| 5,767,804 | A | 6/1998 | Murphy | |
|---|---|---|---|---|
| 2003/0137455 | A1* | 7/2003 | McReynolds | 342/464 |
| 2003/0220117 | A1* | 11/2003 | Duffett-Smith et al. | 455/456.6 |
| 2004/0152420 | A1* | 8/2004 | Redi et al. | 455/67.11 |
| 2004/0203908 | A1* | 10/2004 | Hind et al. | 455/456.1 |
| 2004/0203912 | A1* | 10/2004 | Budka et al. | 455/456.1 |
| 2004/0264397 | A1* | 12/2004 | Benveniste | 370/311 |
| 2005/0146470 | A1* | 7/2005 | Li et al. | 343/702 |
| 2006/0025158 | A1* | 2/2006 | Leblanc et al. | 455/456.2 |
| 2006/0128354 | A1 | 6/2006 | Carle et al. | |
| 2007/0178911 | A1* | 8/2007 | Baumeister et al. | 455/456.1 |
| 2009/0160711 | A1* | 6/2009 | Mehta | 342/450 |

FOREIGN PATENT DOCUMENTS

EP 1345041 A2 9/2003
WO WO2007144463 A1 12/2007

OTHER PUBLICATIONS

International Search Report and Written Opinion—PCT/US2011/045094—ISA/EPO—Oct. 25, 2011.
Shah S.F.A., et al., "Implementation of a directional beacon-based position location algorithm in a signal processing framework", IEEE Transactions on Wireless Communications, IEEE Service Center, Piscataway, NJ, US, Mar. 1, 2010, pp. 1044-1053, vol. 8, No. 3, XP011304517, ISSN: 1536-1276.

\* cited by examiner

*Primary Examiner* — Quan M Hua
(74) *Attorney, Agent, or Firm* — Shyam K. Parekh

(57) ABSTRACT

Disclosed is an apparatus, system and method for determining a location of a mobile device based on a location of a wireless network node, a distance between the wireless network node and the mobile device, and a bearing from the wireless network node to the mobile device, wherein the bearing is determined based on a directional signal and magnetometer measurements.

16 Claims, 17 Drawing Sheets

Magnetometer & accelerometer
measurements
(BRS)

Magnetometer measurements
(LRS) & (BRS)

| Time | Heading |
|---|---|
| $t_1$ | 0° (North) |
| $t_2$ | 30° |
| $t_3$ | 60° |
| $t_4$ | 90° (East) |
| $t_5$ | 120° |
| $t_6$ | 150° |
| $t_7$ | 180° (South) |
| $t_8$ | 210° |
| $t_9$ | 240° |
| $t_{10}$ | 270° (West) |
| $t_{11}$ | 300° |
| $t_{12}$ | 330° |
| $t_{13}$ | 360°/0° |

FIGURE 11

SENSING RELATIVE POSITION FROM A WIRELESS TRANSCEIVER

RELATED APPLICATIONS

Not applicable.

FIELD

This disclosure relates generally to apparatus and methods for location determination and more particularly to determining the location of a mobile device relative to a wireless network node.

BACKGROUND

Today, telecommunication signals are commonly transmitted using cellular systems. Cellular systems comprise groups of cellular base stations, each of which is used to transmit signals to and receive signals from a mobile device, such as a cellular telephone, laptop computer or other such mobile device. In addition to transmitting a variety of voice and/or data signals between the mobile device and the base station, cellular systems are often used to locate such mobile devices, both for emergencies and non-emergencies. For example, in the case of a call to the emergency number 911, it is frequently helpful to determine the location of the caller so that assistance can be dispatched to the caller immediately and without requiring that the caller know his/her location. In non-emergency cases, it is frequently desirable to determine the location of a mobile device to provide services such as roadside assistance, turn-by-turn driving directions, concierge services, location-specific billing rates and location-specific advertising, among others. The location of the mobile device is typically determined through trilateration, a process of establishing distance to three or more known reference points through the measurement of elapsed time of a non-directional signal between the mobile device and each known reference point and then plotting the unique intersection of those three or more solutions.

The CDMA protocol operates using a variety of channels. A Forward CDMA channel carries user and signaling traffic, a pilot signal, and overhead information, from a base station to a mobile device. The pilot and overhead signals establish the system timing and station identity. The pilot channel also provides a signal strength reference that is used in the mobile-assisted handoff (MAHO) process. All base stations have the same pilot waveform and are distinguished from one another only by the phase of the pilot signal.

Various techniques have been used to determine the location of a mobile device. For example, Global Navigation Satellite Systems (GNSS), such as the Global Positioning System (GPS), the GLONASS owned by the Russian Federation Government, and Galileo Radio Navigation Satellite System, are satellite systems that provide users equipped with a GNSS receiver the ability to determine their location anywhere in the world. A GNSS receiver normally determines its location by measuring the relative times of arrival of signals transmitted simultaneously from multiple GNSS satellites. In GNSS-deprived areas, such as indoors, under a heavy canopy and near tall buildings, GNSS equipped mobile devices fail to acquire signals from any or from a sufficient number of GNSS satellites to provide an accurate location.

In GNSS-deprived areas, another well-known position location technique such as Advanced Forward Link Trilateration (AFLT) may be used. The AFLT technique is based on measuring time-of-arrival differences between terrestrial base station pilot signals. In the case of a CDMA wireless network, these measurements are called pilot phase measurements.

It is possible that at a particular location a sufficient number of GNSS satellites and multiple CDMA pilot signals to calculate a fix are not available or the calculated location does not provide sufficient accuracy. Position determination capability is compromised at these locations.

SUMMARY OF THE DISCLOSURE

Disclosed is an apparatus, system and method for determining a location of a mobile device based on a location of a wireless network node, a distance between the wireless network node and the mobile device, and a bearing from the wireless network node to the mobile device, wherein the bearing is determined based on a directional signal and magnetometer and accelerometer measurements. The direction signal may be a time-dependent directional signal and/or a direction-dependent directional signal. The bearing may be determined based on a time of a maximum signal is received at the mobile device. Alternatively, bearing may be determined based on a predetermined relationship or formula between time and the transmit bearing. For example, the bearing may be determined at the wireless network node based on a time determined at the mobile device. Such time determination may require a synchronized time base. Alternatively, the bearing may be determined at the mobile device based on information in the directional signal such as an announced bearing. In addition, a reference bearing may be used in determining the bearing, wherein the reference bearing is determined based on magnetometer and accelerometer measurements. If at least two network nodes are present, the location may also be determined through the intersection of vectors from at least two wireless network nodes.

Disclosed is an apparatus, system and method for determining a location of a mobile device comprising: receiving, at the mobile device, a directional signal; determining a bearing based on a maximum signal received at the mobile device; and determining the location of the mobile device based on the bearing. The location may be computed by the mobile device. In this case, the mobile device computes its location based on the bearing. Alternatively, the location may be computed in a wireless network node, which computes the mobile device's location based on signals received from the mobile device. The wireless network node may comprise: means for transmitting a directional signal from a wireless network node; and means for computing the location of the mobile device and means for transmitting to the mobile device the computed location.

Also disclosed is a mobile device comprising a processor and memory, and a computer-readable medium including software instructions to: receive, at the mobile device, a directional signal; determine a bearing based on a maximum signal received at the mobile device; and receive, at the mobile device and from a wireless network node, the location of the mobile device determined based on the bearing.

Also disclosed is an apparatus, system and method for determining a location of a mobile device based on a bearing, a distance and a location with respect to a single wireless network node, or alternatively, two bearings and two locations to two wireless network nodes, or alternatively, one bearing to a first wireless network node, one distance to a second wireless network node and locations of the wireless network nodes, wherein the bearings are determined based on a directional signal.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

FIG. 11 shows an example table containing times and heading values for a time-dependent directional signal, in accordance with some embodiments of the present invention.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Figure 1:
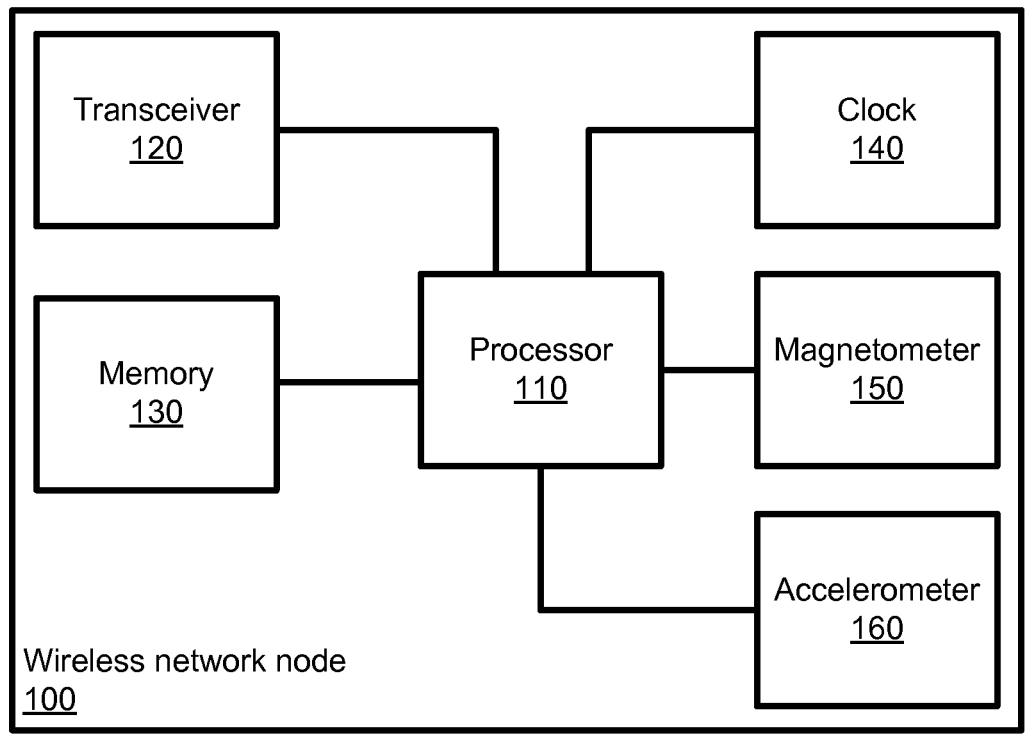
FIG. 1 shows a block diagram of a wireless network node.

FIG. 1 shows a block diagram of a wireless network node 100. The wireless network node 100 may be a base station, an access point or the like. Typically, the wireless network node 100 is portable and may be installed at uncertain horizontal and vertical orientations.

The wireless network node 100 includes a processor 110 coupled to and to coordinate interactions with a transceiver 120, memory 130, a clock 140, a magnetometer 150 and an accelerometer 160. In another embodiment, the wireless network node may exclude an accelerometer 160 and assume that the base of the unit is in a known orientation. For example, the wireless network node 100 may be mounted against a flat bottom or leveled along a flat side thereby automatically orienting the wireless network node 100 and eliminating a need for the accelerometer 160.

The processor 110 operates the transceiver 120 to communicate with mobile devices and a backend network (not shown). The transceiver 120 includes a directional antenna allowing the wireless network node 100 to spatially discriminate its transmitted signal thereby producing a time-dependent directional signal. The memory 130 contains software instructions or program code to execute methods described herein on the processor. These software instructions may be stored in RAM or ROM and also on a computer-readable medium such as in flash memory, CD-ROM, DVD or other magnetic or optical media. The memory 130 may also contain runtime data such as measurements received from sensors such as the magnetometer 150 and the accelerometer 160. The clock 140 provides timing for the processor 110. The processor 110 may be integrated with the memory 130 and the clock 140 such that it is a single silicon device.

The magnetometer 150 assists in determining an orientation of the wireless network node 100 in the horizontal plane and with respect to magnetic north. Knowing the direction of magnetic north allows the processor 110 to convert a relative bearing between the wireless network node 100 and a mobile device into an absolute bearing. If the wireless network node is manually oriented with respect to north, the magnetometer 150 may be eliminated.

The accelerometer 160 is optionally included in the wireless network node 100 and helps to determine a vertical orientation of the body of the wireless network node 100. That is, the accelerometer 160 may be used to determine an up and a down orientation of the wireless network node 100. The accelerometer 160 may also be used to determine whether the wireless network node 100 is in motion or at rest. As used below, an orientation of the body inherently describes an orientation of the antenna or antennas of the wireless network node 100.

Figure 2:
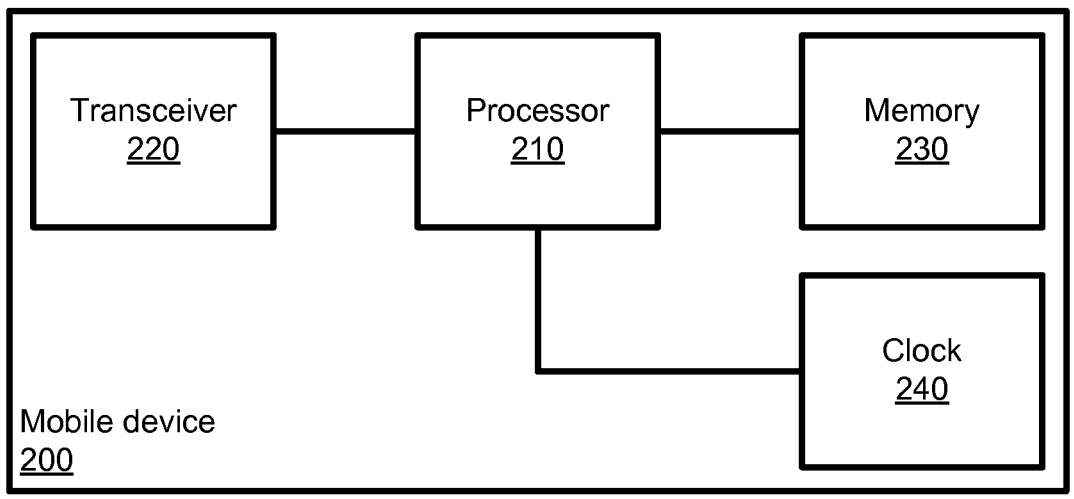
FIG. 2 shows a block diagram of a mobile device.

FIG. 2 shows a block diagram of a mobile device 200. The mobile device 200 includes a processor 210 coupled to and to coordinate interactions with a transceiver 220, memory 230 and a clock 240. The processor 210 operates the transceiver 220 to communicate with the wireless network node 100. The memory 130 contains software instructions or program code to execute methods described herein on the processor. These software instructions may be stored in RAM or ROM and also on a computer-readable medium such as in flash memory, CD-ROM, DVD or other magnetic or optical media. The clock 140 provides timing for the processor 110. The processor 110 may be integrated with the memory 130 and the clock 140 into a single silicon device.

Figure 3:
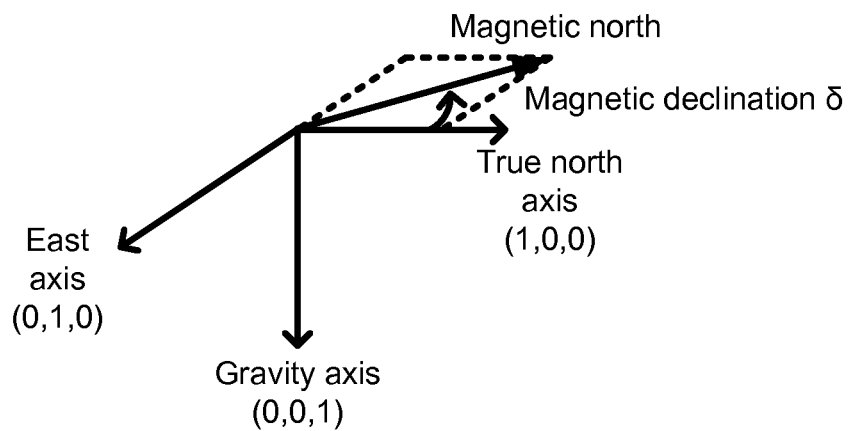
FIGS. 3, 4, 5, 6 and 7 illustrate references systems for body positioning and measurements.

FIGS. 3, 4, 5, 6 and 7 illustrate references systems for body positioning and measurements. FIG. 3 shows a reference system with respect to a physical location of the wireless network node 100. This reference system is referred to as a local reference system (LRS) and has a vertical access and two cardinal direction axes. The vertical access (0, 0, 1) represents a direction of gravity. The two cardinal directions define a horizontal plane perpendicular to the vertical access and include a true north axis (1, 0, 0) and an east axis (0, 1, 0).

Magnetic north $N_{MAG}$ falls within the horizontal plane and is offset from true north $N_{TRUE}$ by an angle referred to as magnetic declination 6.

Figure 4:
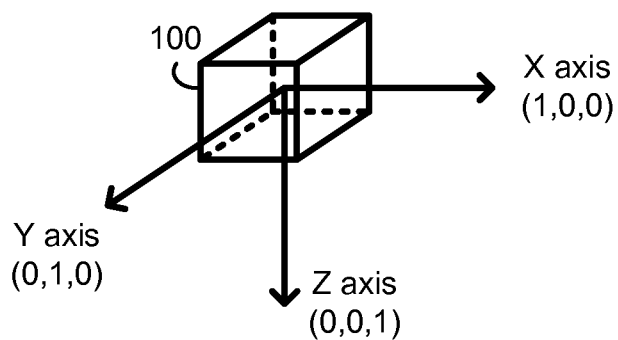

FIG. 4 shows a reference system with respect to the body of the wireless network node 100. This reference system is referred to as a body reference system (BRS) and is represented by X (1, 0, 0), Y (0, 1, 0) and Z (0, 0, 1) axes. Measurements from the magnetometer 150 and the accelerometer 160 are generated with respect to the body reference system.

Figure 5:
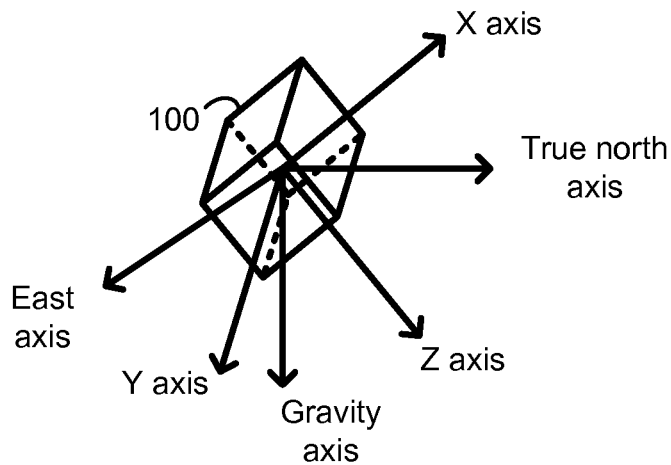

FIG. 5 shows an example relationship between the body reference system (BRS) and the local reference system (LRS). The wireless network node 100 may use a rotation matrix to convert between the two reference systems. The rotation matrix is determined based on sensor data from the magnetometer 150 and accelerometer 160. To convert vectors between the reference systems, the wireless network node 100 may compute a rotation matrix during initialization. First, the wireless network node 100 senses its position in the BRS using its magnetometer 150 and accelerometer 160. The magnetometer 150 provides a magnetic field vector (magnetic north plus an inclination) and the accelerometer 160 provides a vector parallel to gravity. Once a gravity vector is determined, a magnetic north $N_{MAG}$ is determined as the component of the magnetic field vector that is perpendicular to the gravity vector. In essence, the magnetic inclination is removed from the magnetic field vector thereby resulting in a magnetic north $N_{MAG}$ vector.

Figure 6:
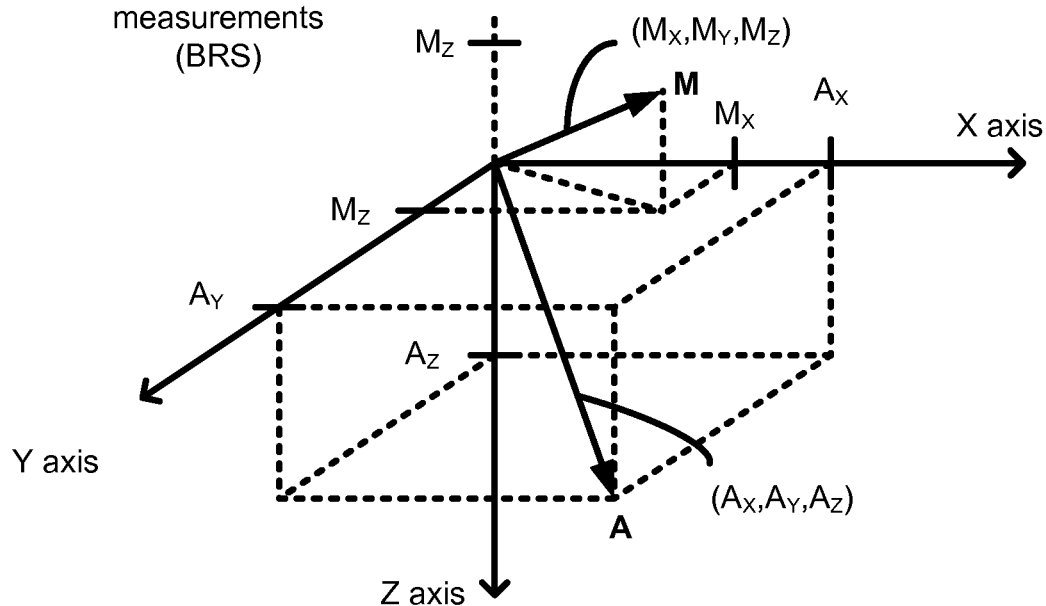

FIG. 6 shows magnetometer and accelerometer vectors from the magnetometer 150 and accelerometer 160, respectively. The magnetometer 150 senses a measured magnetic field relative to the body reference system as three measurements: $M_X$, $M_Y$ and $M_Z$. In vector form, the magnetometer measurements may be written as $M=(M_X, M_Y, M_Z)_{BRS}$. The accelerometer 160 also provides three measurements: $A_X$, $A_Y$ and $A_Z$, which may written as an accelerometer vector $A=(A_X, A_Y, A_Z)_{BRS}$. Assuming the wireless network node 100 is at rest, vector A is parallel to gravity. Over time, the vector A may be examined to determine it is not changing and therefore the wireless network node 100 is stationary. The vector M falls in a plane formed by vector A and magnetic north $N_{MAG}$. In the local reference system, the accelerometer vector $A=(0, 0, G)_{LRS}$ and the magnetometer vector $M=(M_N, 0, M_G)_{LRS}$.

Figure 7:
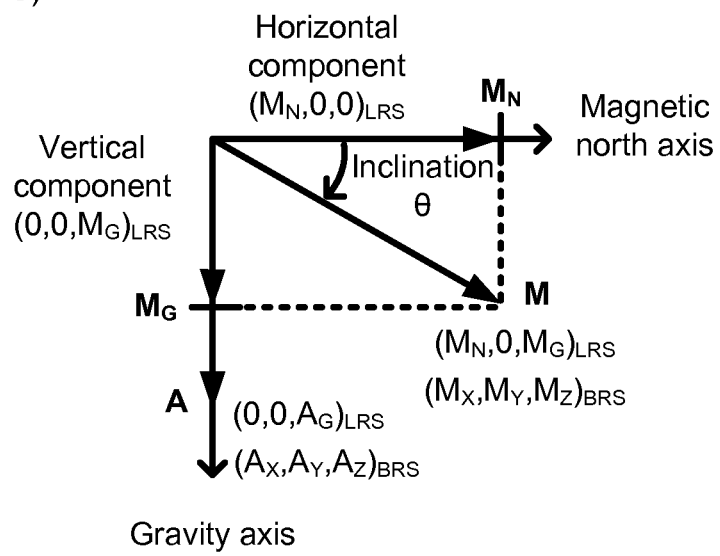

FIG. 7 illustrates the relationship between vector A, vector M and inclination $\theta$. The figures shows the vector M decomposed into a horizontal component $M_N=(M_N, 0, 0)_{LRS}$ and a vertical component $M_G=(0, 0, M_G)_{LRS}$. The vertical component $M_G$ runs parallel with the acceleration vector A. The magnetic inclination is defined as the angle $\theta$ formed between magnetic north $M_N=(M_N, 0, 0)_{LRS}$ and the magnetometer measurement vector M, where $\theta=\tan^{-1}(M_N/M_G)$. At initialization, the wireless network node 100 computes the rotation matrix by assuming $M_G$ runs parallel with the acceleration vector A and also assuming $M_N$ points towards magnetic north $N_{MAG}$.

Figure 8:
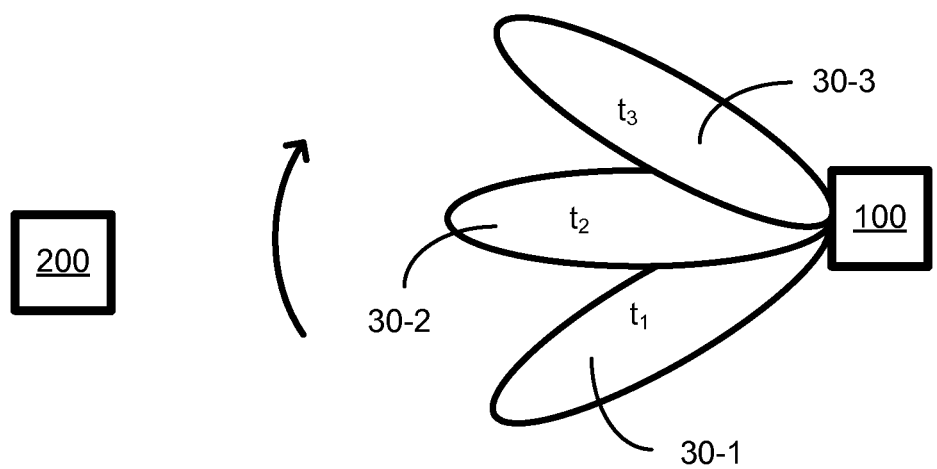
FIGS. 8, 9A and 9B show time-dependent directional signals, in accordance with some embodiments of the present invention.
Figure 9A:
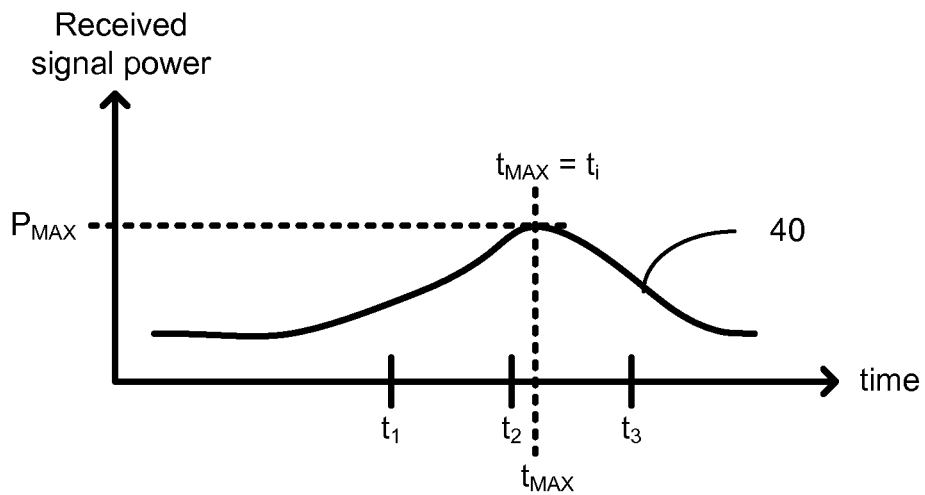
Figure 9B:
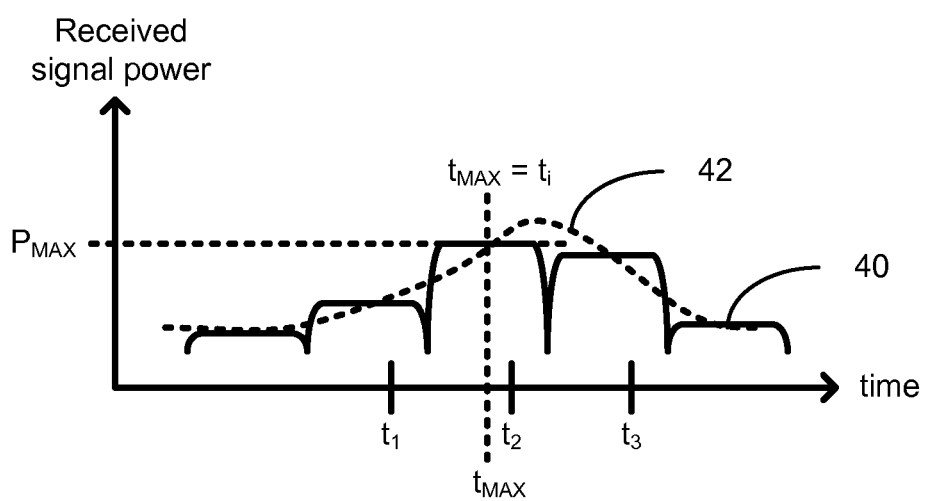

FIGS. 8, 9A and 9B show time-dependent directional signals, in accordance with some embodiments of the present invention.

In FIG. 8, a wireless network node 100 transmits a directional signal 30 that is swept at various angles for reception by a mobile device 200. In some embodiments, the directional signal 30 is a time-dependent directional signal. For example, the wireless network node 100 transmits a directional signal 30 that is swept and includes a first directional signal 30-1 in a first direction (e.g., 240°) at a first time $t_1$, a second directional signal 30-2 in a second direction (e.g., 270°) at a second time $t_2$, and a third directional signal 30-3 in a third direction (e.g., 300°) at a third time $t_3$. The first, second and third directional signals 30-1, 30-2, 30-3 may be identical in all respects except that the signals are transmitted in different directions and at different times. In some embodiments, the directional signal 30 is a direction-dependent signal. That is, the directional signal 30 directly announces its transmitted direction by including the direction information as an angle encoded within the directional signal 30. In some cases, the direction-dependent signal might not be a time-dependent signal. In other cases, the directional signal 30 is both a time-dependent signal and a direction-dependent signal.

Additionally, the directional signal 30 may be continuous or, alternatively, discrete. If continuous, a received signal 40 will appear to be rising as the transmit direction of the directional signal 30 approaches the bearing between the wireless network node 100 and the mobile device 200. Later, the received signal 40 will appear to be falling as the transmit direction deviates from the bearing. If the directional signal 30 is discrete, the received signal 40 will appear as steps having amplitudes that are greater when the signal is transmitted towards the mobile device 200.

FIG. 9A shows a signal power received at a mobile device 200. The signal power may be referred to as a received signal strength indication (RSSI). If the directional signal 30 transmitted by the wireless network node 100 is a continuously sweeping signal, the mobile device 200 will receive a signal 40 that ramps up as the signal direction is aimed towards the mobile device 200 and ramps down as the signal direction is aimed away. At time $t_i=t_{MAX}$, the mobile device 200 receives a maximum signal power $P_{MAX}$. As shown in the example received signal power graph, $P_{MAX}$ occurs at a time just after time $t_2$.

FIG. 9B shows a signal power received at a mobile device 200 when the wireless network node 100 transmits a discrete directional signal 30. The wireless network node 100 continuously transmits a directional signal 30-1 in a first fix direction for a discrete duration then advances to transmit the directional signal 30-2 in a second fix direction for the next discrete duration. The mobile device 200 receives a signal 40 as steps, where each step gains in power as the directional signal 30 is directed closer and closer towards the mobile device 200 and each steps looses power as the signal direction heads away from the mobile device 200. Examining just the step with the maximum signal power $P_{MAX}$, the mobile device 200 determines time $t_i=t_{MAX}$. This time $t_{MAX}$ correlates to the bearing between the wireless network node 100 to the mobile device 200.

As shown, $t_i=t_{MAX}$ is centered on the maximum step. Alternatively, $t_{MAX}$ may be determined based on more than the maximum step such as weighting the magnitudes of side steps, for example by a low pass filter. For example, since the second large step lags the maximum step, $t_{MAX}$ may be weighted to a time later than the center of the maximum step. Alternatively, center points of several step may be used to extrapolate a curve 42 and the maximum point of that curve may be used to set $t_{MAX}$.

Figure 10:
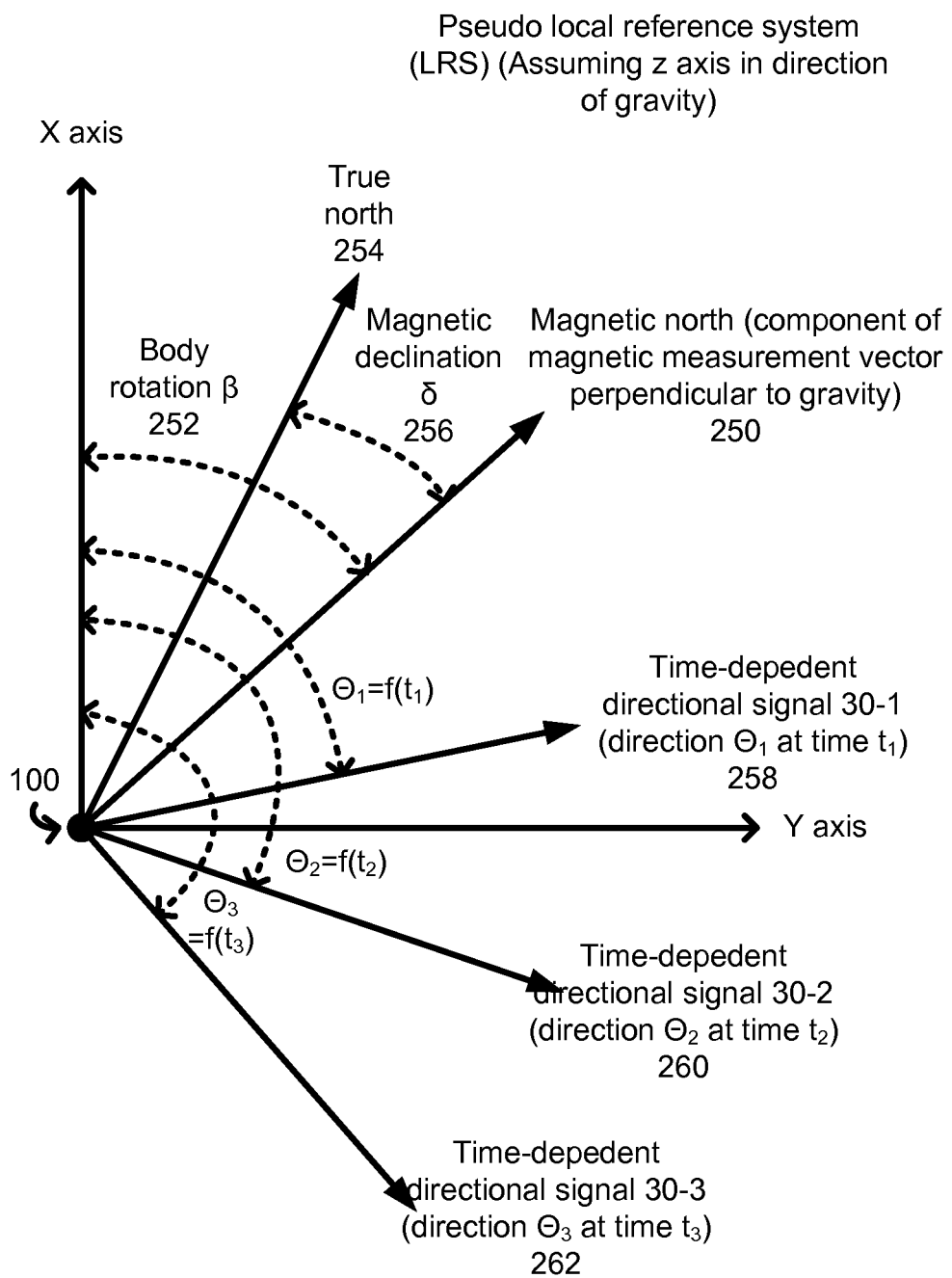
FIG. 10 shows a correlation of various positioning measurements, in accordance with some embodiments of the present invention.

FIG. 10 shows a correlation of various positioning measurements, in accordance with some embodiments of the present invention. For clarity, a body reference system is assumed to be inline with gravity (i.e., $A=(0, 0, A_Z)_{BRS}$), therefore, the X-Y vector plot represents a top-down view of the body in the horizontal plane; however, the body of the wireless network node 100 is assumed to be arbitrarily rotated with respect to the local reference system. The angle formed between the X axis of the body and magnetic north $N_{MAG}$ 250 is referred to as the body rotation $\beta$. The angle formed between magnetic north $N_{MAG}$ 250 and true north 254 is referred to as magnetic declination δ 256.

Each time $\{t_i\}$ represents an angle of the transmitted signal $\{\theta_i\}$ such that $\theta_i=f(t_i)$. For example, at a first time $t_1$, a directional signal 30-1 is transmitted at an angle $\theta_1$ (represented by vector 258), at a second time $t_2$, the directional signal 30-2 is transmitted at an angle $\theta_2$ (represented by vector 260), and at a third time $t_3$, the directional signal 30-3 is transmitted at an angle $\theta_3$ (represented by vector 262). The function $f(t_i)$ may be either continuous (represented by curve 40 illustrated in FIG. 9A) or discrete represented by curve 40 illustrated in FIG. 9B).

FIG. 11 shows an example table containing times and heading values for a time-dependent directional signal 30, in accordance with some embodiments of the present invention. The table represents a directional signal 30 sweeping 360° in uniform steps of 30°. Alternatively, a directional signal 30 may be swept to cover less than a full 360° circle and may also have steps smaller or larger than 30° or have non-uniform steps. For example, a wireless network node 100 may transmit a discrete directional signal 30 sweeping 360° in uniform steps of 45°. Alternatively, the wireless network node 100 may transmit a discrete signal sweeping 180° in uniform steps of 15°. Alternatively, the wireless network node 100 may transmit a discrete directional signal 30 sweeping in non-uniform steps over 180° dependent on limitations of the transmitting hardware and antenna configuration.

Figure 12:
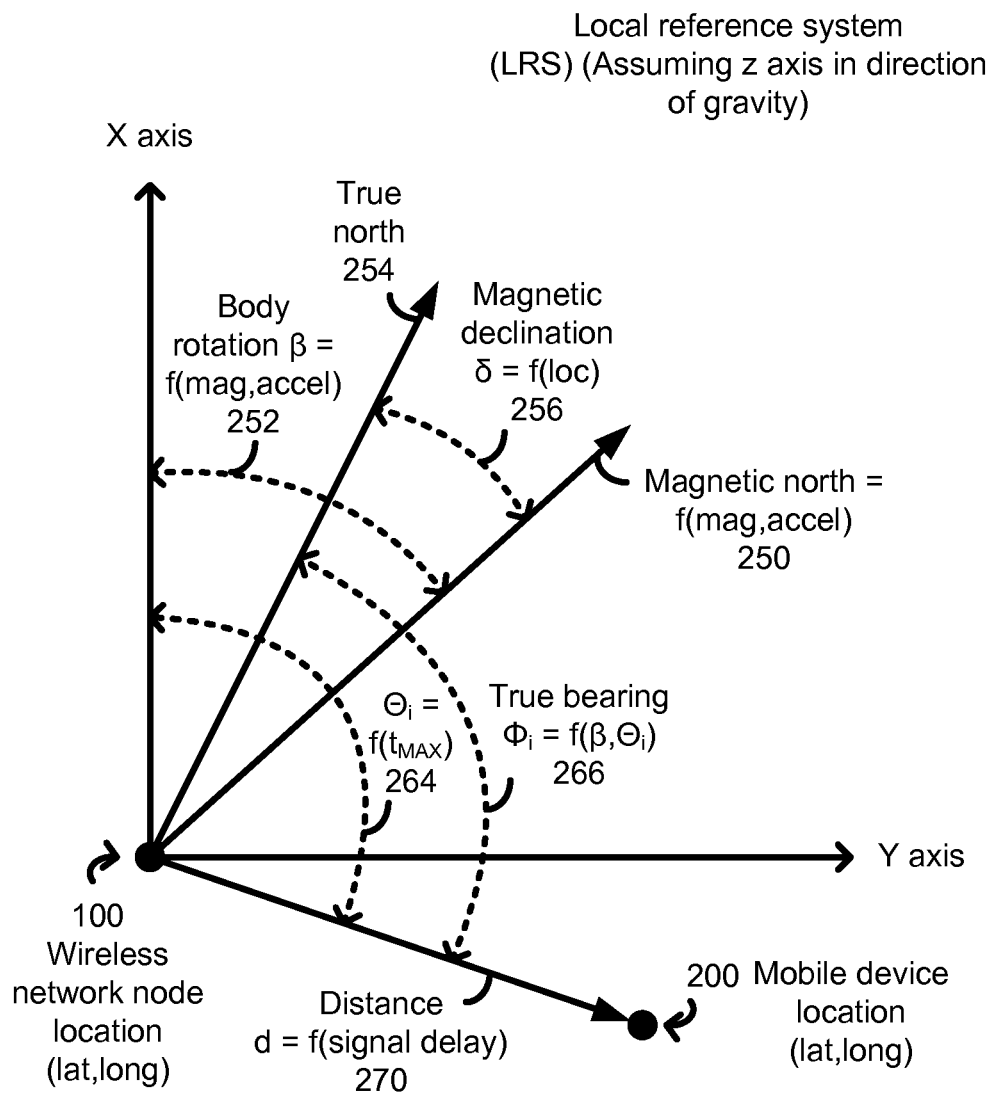
FIG. 12 shows a correlation of various parameters and variables used during position location, in accordance with some embodiments of the present invention.

FIG. 12 shows a correlation of various parameters and variables used during position location, in accordance with some embodiments of the present invention. The parameters and variables include: (1) magnetic declination δ 256, which is the angle formed in the horizontal plane between true north $N_{TRUE}$ 254 and magnetic north $N_{MAG}$ 250, and is a function of location on the Earth; (2) body rotation β 252, which is the angle formed between the X axis and magnetic north $N_{MAG}$ 250 and is a function of measurements from the magnetometer 150 and the accelerometer 160; (3) magnetic north $N_{MAG}$ 250, which is also a function of measurements from the magnetometer 150 and the accelerometer 160; (4) bearing $\Theta_i$ 264, which is the bearing from the wireless network node 100 and the mobile device 200 based on the body reference system, and is a function of at time $t_i$; (5) true bearing $\Phi_i$ 266, which is the true bearing from the wireless network node 100 to the mobile device 200 independent of the body position, and is a function of body rotation β 252 and bearing $\Theta_i$ 264; and (6) distance d 270, which is the distance between the wireless network node 100 and the mobile device 200, and is a function of signal delay.

Figure 13:
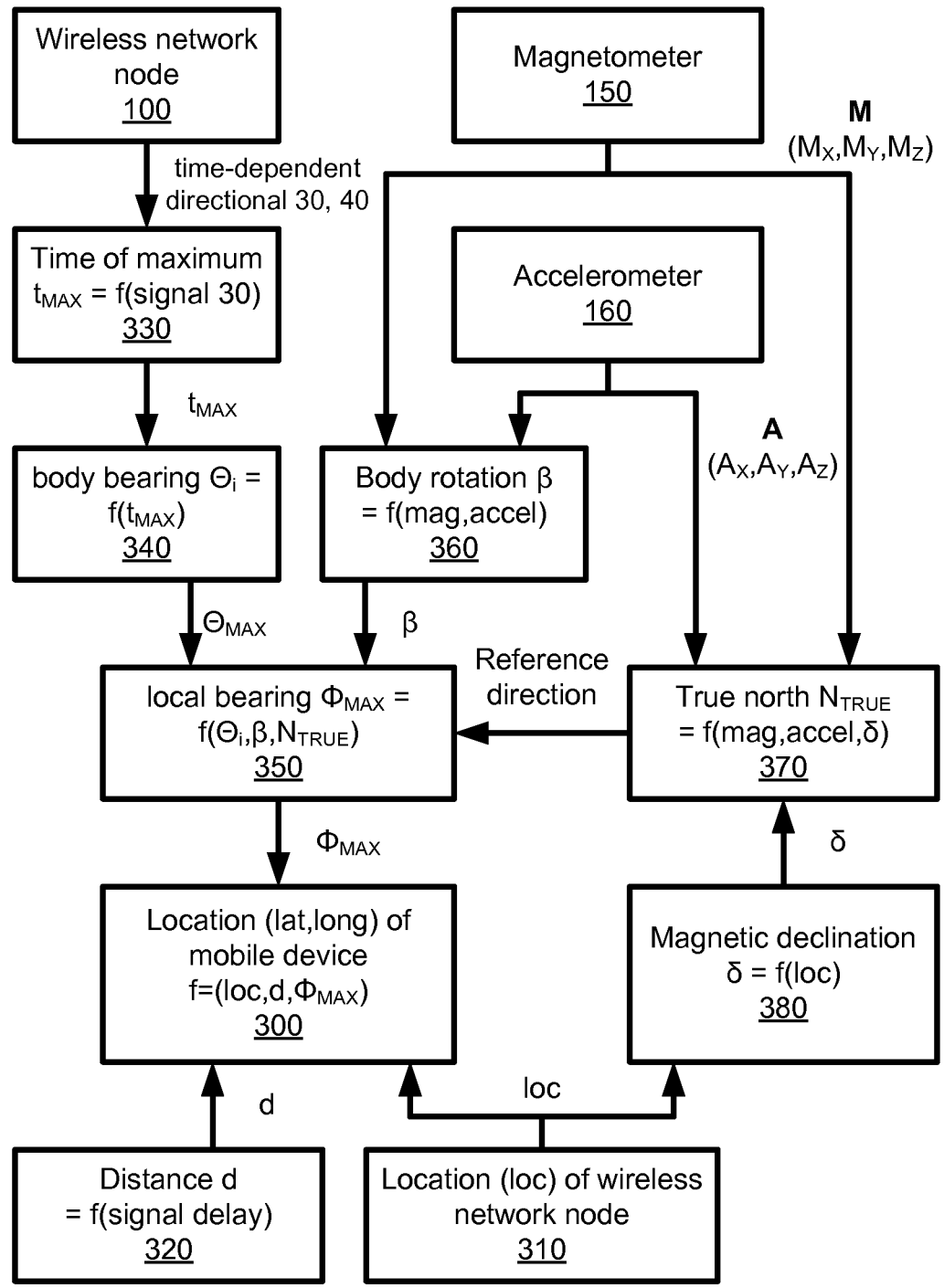
FIG. 13 illustrates one possible flow of data used in determining a location of a mobile device based on a time-dependent directional signal, measurements from sensors and data stored in memory, in accordance with some embodiments of the present invention.

FIG. 13 illustrates one possible flow of parameters used in determining a location of a mobile device based on a time-dependent directional signal 30, measurements from sensors and supplementary data, in accordance with some embodiments of the present invention.

At 300, the location of the mobile device 200 is determined based on predetermined parameters: (1) location (loc) of the wireless network node 100; (2) a distance d; and (3) a local bearing $\Phi_{MAX}$. These parameters may be determined independently and as follows.

At 310, location (loc) of the wireless network node 100 is set manually, read from a lookup table or determined using a position location technique. This location is typically an absolute location with reference to the local reference system. In this case, a computed location of the mobile device 200 may be represented independently from the location of the wireless network node 100. Alternatively, if an absolute location of the wireless network node 100 is unknown, a relative location of the mobile device 200 is determined based on location (loc) and distance d resulting in a position of the mobile device 200 that is relative to the position of the wireless network node 100.

At 320, the distance d is determined. This distance d represents a line-of-sight distance between the wireless network node 100 and the mobile device 200. The distance d may be determined in a variety of ways. For example, the wireless network node 100 may determine the time it takes to transmit and receive a round-trip signal accounting for delays inherent in the mobile device 200. Alternatively, the distance may be determined by a processor on the mobile device based on a one-way signal, a phase offset and/or time difference of arrival. In some cases, the wireless network node 100 and the mobile device 200 may have synchronized clocks. With synchronized clocks, the network node 100 may transmit a one-way signal to the mobile device 200. The mobile device 200 determines a time difference between (1) when the one-way signal was transmitted and (2) when it was received. Based on the round-trip, one-way time, phase offset and/or time difference of arrival, a distance may be determined (e.g., from d=c*t, where c is the speed of light and t is the determined time).

To determine a local bearing $\Phi_{MAX}$, a sequence begins with the wireless network node 100 transmitting a time-dependent directional signal 30 at a number of body bearings $\{\Theta_j\}$. The body bearings $\{\Theta_j\}$ each represent an angle with respect to the body reference system of the wireless network node 100 transmitting the directional signal 30. Each body bearing $\Theta_j$ also correspond to a local bearing $\Phi_j$. The local bearings $\{\Phi_j\}$ represent cardinal directions at times $\{t_j\}$ that the wireless network node 100 transmits the time-dependent directional signal 30 in the $\{\Phi_j\}$ direction. For example, the wireless network node 100 may transmit the directional signal 30 at bearing $\Phi_j=\Theta_j+N_{TRUE}=(j-1)*30+N_{TRUE}$ [in degrees] at time $t_j=(j-1)/12$ [in seconds] at index j=1 to 12. Alternatively or in addition to, the directional signal 30 may be a directional-dependent signal encoding a transmitted direction within the directional signal 30.

At 330, the mobile device 200 receives this directional signal 30 as received signal 40 having variable signal strength. Once received, the mobile device 200 determines a time $t_{MAX}$ of a maximum point of the received signal 40. The maximum point may be based on a maximum signal power or signal strength, for example, represented numerically from a digitized voltage or current. The maximum signal is determined to occur at a time $t_{MAX}$, which is assumed as explained below to correlate to a local bearing $\Phi_{MAX}$ representing a heading or bearing from wireless network node 100 to the mobile device 200. This time $t_{MAX}$ also corresponds to a body bearing $\Theta_{MAX}$. The body bearing $\Theta_{MAX}$ represents a heading in a body reference system of the directional signal 30 from the wireless network node 100. In general, the body bearing $\Theta_i$ indicates an angle with respect to the body reference system and is independent of the local reference system.

At 340, this time $t_{MAX}$ is converted from a time to an angle $\Theta_{MAX}$. It is assumed the variable signal strength of the received signal 40 represents an angle offset between: (1) the transmitted signal local bearing $\Phi_j$; and (2) an actual bearing formed from the wireless network node 100 to the mobile device 200. When the signal is at maximum value, this angle offset is at minimum value. Therefore, the angle $\Theta_{MAX}$ represents the bearing closed to an actual bearing in the body reference system. The body bearing $\Theta_i$ may be determined indirectly from a table or a formula as described above. For example, assume the directional signal 30 is a time-dependent signal continuously rotating at a rotation rate $R_{ROTATION}$ of 360 degrees per second where a reference time $t_{REF}$ represents a time the directional signal 30 was transmitted at 0 degrees (due north). If $t_{MAX}$ represents an absolute time, the body bearing $\Theta_{MAX}$ equals mod $\{(t_{MAX}-t_{REF})*360*R_{ROTATION}, 360\}$ [in degrees]. If $t_{MAX}$ represents a relative time from $t_{REF}$, the body bearing $\Theta_t$ equals mod($(t_{MAX})*360*R_{ROTATION}, 360$).

At 350, a local bearing $\Phi_{MAX}$ may be determined from the body bearing $\Theta_{MAX}$. This local bearing $\Phi_{MAX}$ is relative to a predetermined reference direction such as magnetic north $N_{MAG}$ or alternatively true north $N_{TRUE}$. If true north $N_{TRUE}$ is available, the local bearing $\Phi_{MAX}$ represents a direction relative to true north. If true north $N_{TRUE}$ is not available, the local bearing $\Phi_{MAX}$ represents a direction relative to magnetic north. The local bearing $\Phi_{MAX}$ is computed by translating the body bearing $\Theta_{MAX}$ using a body rotation β (or rotation matrix R) and the reference direction. In some cases, the time $t_{MAX}$ is converted to a body bearing, which is in turn converted to a local bearing. In other cases, $t_{MAX}$ is converted directly to a local bearing.

At 360, a body rotation β is determined as described above based on magnetometer measurement M ($M_X$, $M_Y$, $M_Z$) from the magnetometer 150 and accelerometer measurement A ($A_X$, $A_Y$, $A_Z$) from the accelerometer 160. As explained above, the body rotation β is used to translate between a body reference system and a local reference system and may be represented by a rotation matrix. The accelerometer measurements A are used to determine when the wireless network node 100 is at rest and, when at rest, are used to determine a direction of gravity relative to the body of the wireless network node 100. The magnetometer measurements M form two components in a body reference system as described above. One component is parallel to the direction of gravity and a second component is perpendicular to the direction of gravity. This perpendicular component represents magnetic north $N_{MAG}$. The angle formed between the magnetometer measurements M and the perpendicular component defines the magnetic inclinations δ. Based on measurements A and M in the BRS and assumptions guarding the LRS, body rotation β is determined A first component of the body rotation accounts for a rotational offset between the body's Z axis and the gravity vector. A second component of the body rotation accounts for a rotational offset about the gravity vector to align the X axis with magnetic north $N_{MAG}$. Once determined, the body rotation β may be used to determine the rotation matrix R and to translate vectors in the body reference system to vectors in the local reference system.

At 370, a reference direction is determined from at least the magnetometer measurements M. For example, a reference direction may be magnetic north $N_{MAG}$, which may be estimated from M. Accelerometer measurements A may enhance this reference direction. For example, only magnetometer measurements M perpendicular to the accelerometer measurements A are used. Alternatively, the reference direction is determined from the magnetometer measurements M in combination with a magnetic declination δ. In this case, the reference direction is true north $N_{TRUE}$.

At 380, the magnetic declination δ may be determined based on the location (loc) of the wireless network node 100 provided by 310. For example, a lookup table may be used to set the declination δ based on the location. Alternatively, the magnetic declination δ may be set manually and saved during installation of the wireless network node 100.

Each of the above-described steps may be performed in one or either of the wireless network node 100 and the mobile device 200. In some embodiments, a step is performed in either the wireless network node 100 or the mobile device 200. In some embodiments, a step is partially performed in the wireless network node 100 and partially performed the mobile device 200. To illustrate a variety of implementations, several embodiments are described below.

Figure 14:
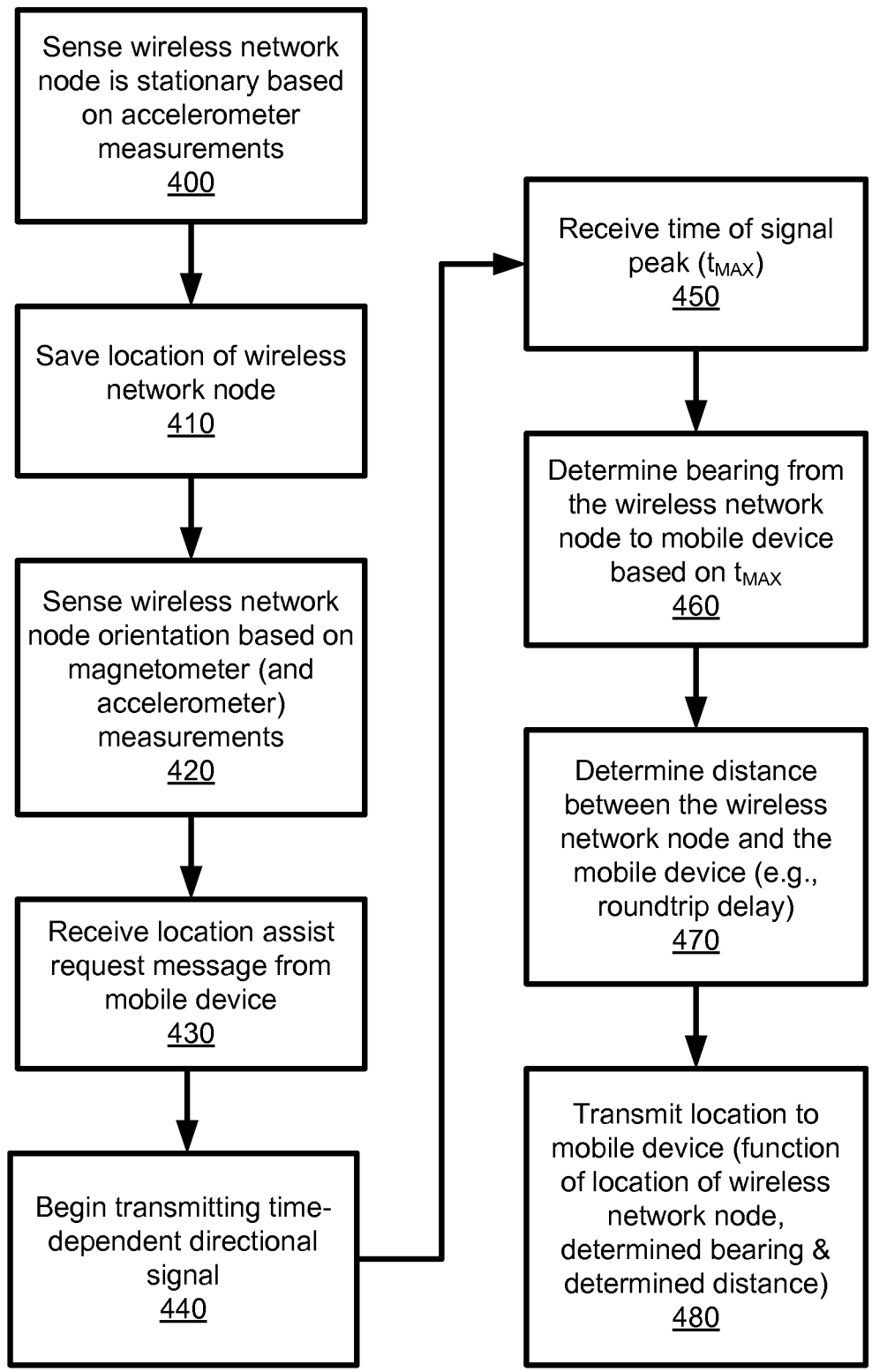
FIGS. 14 and 15 show flow diagrams for determining a location of a mobile device, in accordance with some embodiments of the present invention.
Figure 15:
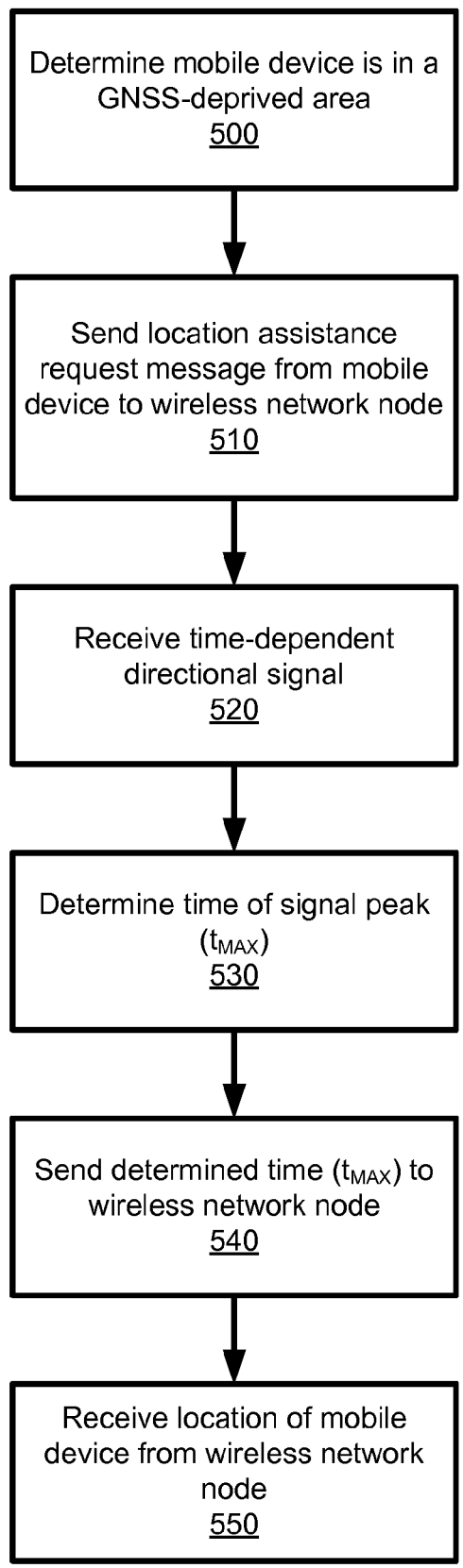

FIGS. 14 and 15 show flow diagrams for determining a location of a mobile device 200, in accordance with some embodiments of the present invention. These flow diagrams are shown as operations performed in steps, however, not all are necessary and not necessarily shown in a chronological order. FIG. 14 shows a process performed in a wireless network node 100.

At 400, the wireless network node 100 uses accelerometer measurements from the accelerometer 160 to sense if the wireless network node 100 is stationary.

At 410, the wireless network node 100 determines and saves it location.

At 420, the wireless network node 100 senses its orientation based on magnetometer and accelerometer measurements. Based on these measurements, the wireless network node 100 may determine its body rotation β and/or a rotation matrix.

At 430, the wireless network node 100 receives a location assistance request message 600 sent by a mobile device 200. The request message 600 may include a time-synchronization communication signal and/or a round-trip delay (RTD) signal for estimating elapsed time.

At 440, the wireless network node 100 begins transmitting a directional signal 30. The wireless network node 100 may transmit the directional signal 30 periodically, continuously, on request or in response to a condition. For example, the wireless network node 100 may begin transmitting the directional signal 30 based on receiving a location assistance request message 600. The mobile device 200 receives the directional signal 30 as received signal 40. The mobile device 200 determines a peak of the received signal 40 and a corresponding time $t_{MAX}$ of the signal peak.

At 450, the wireless network node 100 receives this time $t_{MAX}$ from the mobile device 200. In some cases, the time $t_{MAX}$ may be a component of the location request message, for example, if not needed to initiate transmission of the directional signal 30.

At 460, the wireless network node 100 uses the time $t_{MAX}$ to determine a local bearing $\Phi_{MAX}$ or a body bearing $\Theta_{MAX}$ based on $t_{MAX}$ and knowing what direction it transmitted the directional signal 30 at time $t_{MAX}$.

At 470, the wireless network node 100 determines distance d between the wireless network node 100 and the mobile device 200 (e.g., using roundtrip delay). Alternatively, the mobile device 200 determines this distance and sends it to the wireless network node 100.

At 480, the wireless network node 100 uses the local bearing $\Phi_{MAX}$, the distance d and the location of the wireless network node 100 to determine a location of the mobile device 200. The wireless network node 100 may then transmit the determined location to mobile device 200.

FIG. 15 shows a corresponding process performed in a mobile device 200. At step 500, the mobile device 200 determines it is in a GNSS-deprived area. If not in a GNSS-deprived area, the mobile device 200 could use a GNSS service such as from GPS satellites. When in a GNSS-deprived area, the mobile device 200 must uses other means to determine its location.

At step 510, the mobile device 200 sends location assistance request message 600 from mobile device 200 to the wireless network node 100. This message may be sent to initiate transmission of the directional signal 30. Alternatively, this message may contain the time $t_{MAX}$ described below.

At step 520, the mobile device 200 receives a directional signal 30 as received signal 40.

At step 530, the mobile device 200 determines a time $t_{MAX}$ representing a time when a signal peak of the signal 40 was received.

At step 540, the mobile device 200 sends the determined time $t_{MAX}$ to wireless network node 100. In some cases, the determined time $t_{MAX}$ is included as part of the location assistance request message 600 or included in a separate message 610.

At step 550, the mobile device 200 receives the location of mobile device 100 as determined wireless network node 100 based on the determined time $t_{MAX}$.

Figure 16A:
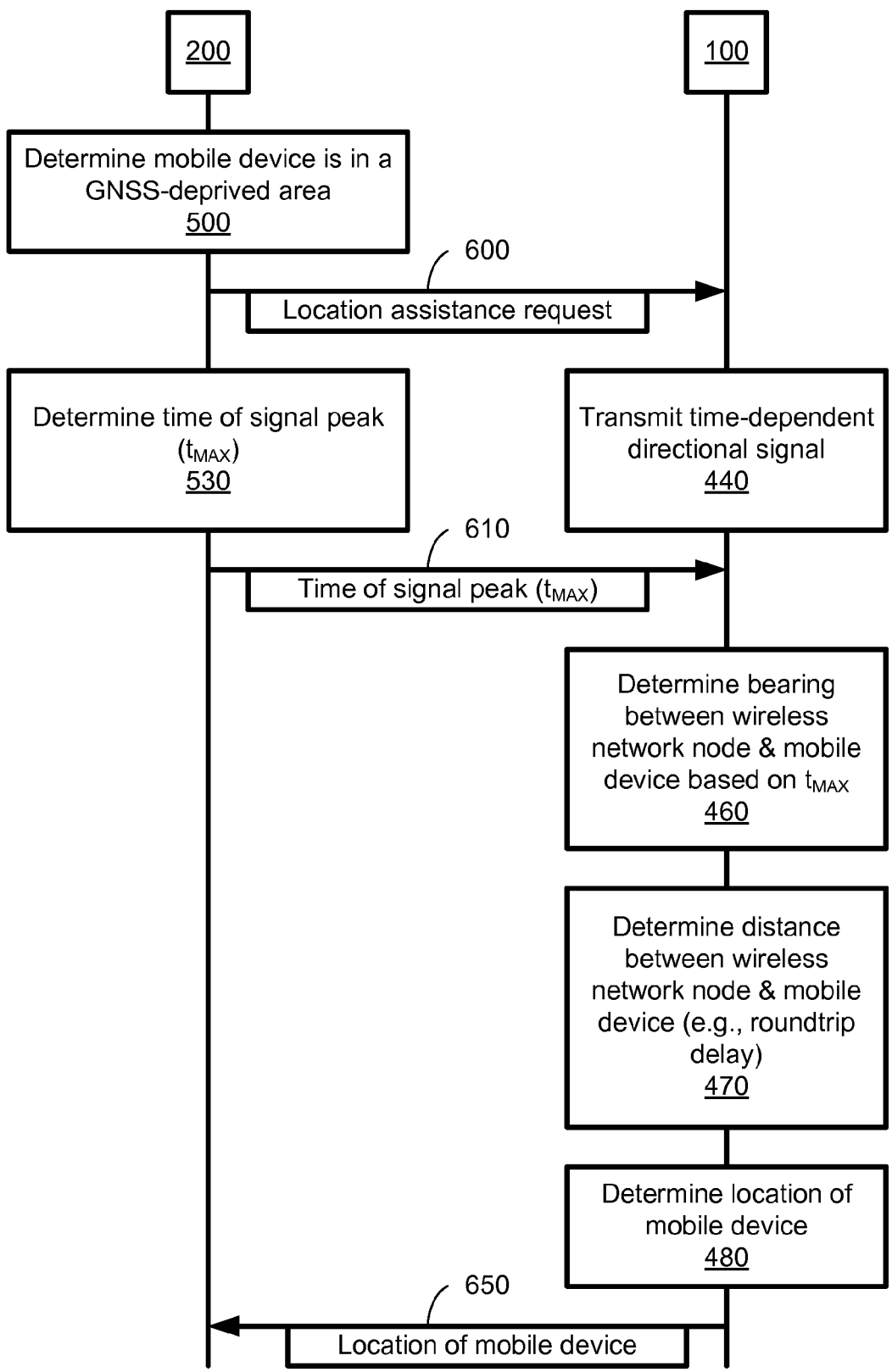
FIGS. 16A, 16B, 16C and 16D illustrate process and signaling flow between a wireless network node and a mobile device, in accordance with some embodiments of the present invention.

FIGS. 16A, 16B, 16C and 16D illustrate process and signaling flow between a wireless network node 100 and a mobile device 200, in accordance with some embodiments of the present invention. In FIG. 16A, the wireless network node 100 determines the location of the mobile device 200 based on a peak time measurement from the mobile device 200.

At 500, the mobile device 200 determines it is in a GNSS-deprived area. The mobile device 200 sends a location assistance request message 600 to the wireless network node 100.

At 440, the wireless network node 100 transmits a directional signal 30. In some embodiments, the transmission of the directional signal 30 is independent of reception of a location assistance request message 600. In other embodiments, reception of a location assistance request message 600 triggers the transmission of the directional signal 30.

At 530, the mobile device 200 receives the directional signal 30 as received signal 40 and determines a time $t_{MAX}$ when a signal peak occurs in the received signal 40. The mobile device 200 sends the determined time $t_{MAX}$ to the wireless network node 100 as message 610. In some embodiments, messages 600 and 610 are combined into a single message.

At 460, the wireless network node 100 determines a bearing from the wireless network node 100 to the mobile device 200 based on the determined time $t_{MAX}$. At 470, the wireless network node 100 determines a distance d between the wireless network node 100 and the mobile device 200. At 480, the wireless network node 100 determines the location of the mobile device 200 based on the determined bearing and determined distance. The wireless network node 100 may use this location information internally and/or send it to a third party and/or send it to the mobile device 200 as message 650.

Figure 16B:
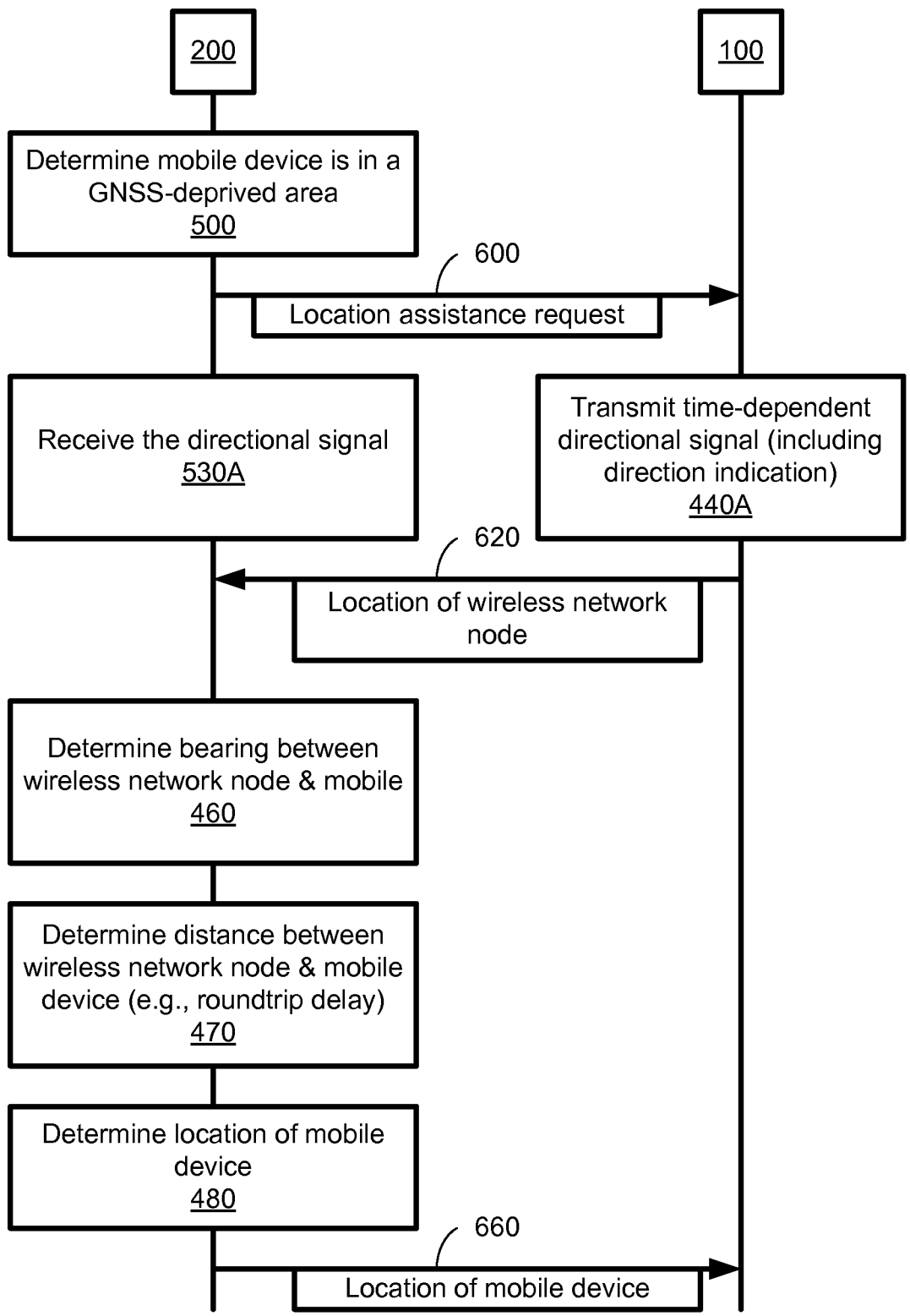

In FIG. 16B, the mobile device 200 determines a bearing, a distance and its location based on a location of the wireless network node 100.

At 500, the mobile device 200 determines it is in a GNSS-deprived area. The mobile device 200 sends a location assistance request message 600 to the wireless network node 100. If transmission of the directional signal 30 is independent from the location assistance request message 600, this message 600 may be omitted.

At 440A, the wireless network node 100 transmits a directional signal 30, and at 530A, the mobile device 200 receives the signal as received signal 40. In some embodiments, the directional signal 30 directly or indirectly contains direction information. In other embodiments, the direction information is contained in a separate message (not shown). Such direction information is used by the mobile device 200 to determine a bearing of transmission of the directional signal 30. In some embodiments, the directional signal 30 is a direction-dependent directional signal where it directly announces a direction. In this case, the directional signal 30 includes direction information as an angle encoded within the directional signal 30. For example, when the directional signal 30 is transmitted at a bearing of 180 degrees, the signal may include a value representing "180 degrees" within the directional signal 30. Alternatively, the direction information may indirectly indicate a function that maps a time and the signal direction. For example, the direction information may include a reference time the directional signal 30 is transmitted in a particular direction and may also include a rate of rotation. With this information the mobile device 200 may determine the direction the received signal 40 was transmitted at a particular time. In message 620, the wireless network node 100 sends its location to the mobile device 200. The message 620 may include a latitude-longitude pair or other data indicating the location of the wireless network node 100. The mobile device 200 uses this location when determining the location of the mobile device 200. In some embodiments, message 620 also contains the direction information.

At 460, the mobile device 200 determines a bearing from the wireless network node 100 to the mobile device 200 based on the received signal 40 and the direction information. At 470, the mobile device 200 determines a distance d between the wireless network node 100 and the mobile device 200. At 480, the mobile device 200 determines the location of the mobile device 200 based on the determined bearing and determined distance. In some embodiments, the mobile device 200 sends the determined location to the wireless network node 100 in a message 660. The message 660 may also include a latitude-longitude pair or other data indicating the location of the mobile device 200.

Figure 16C:
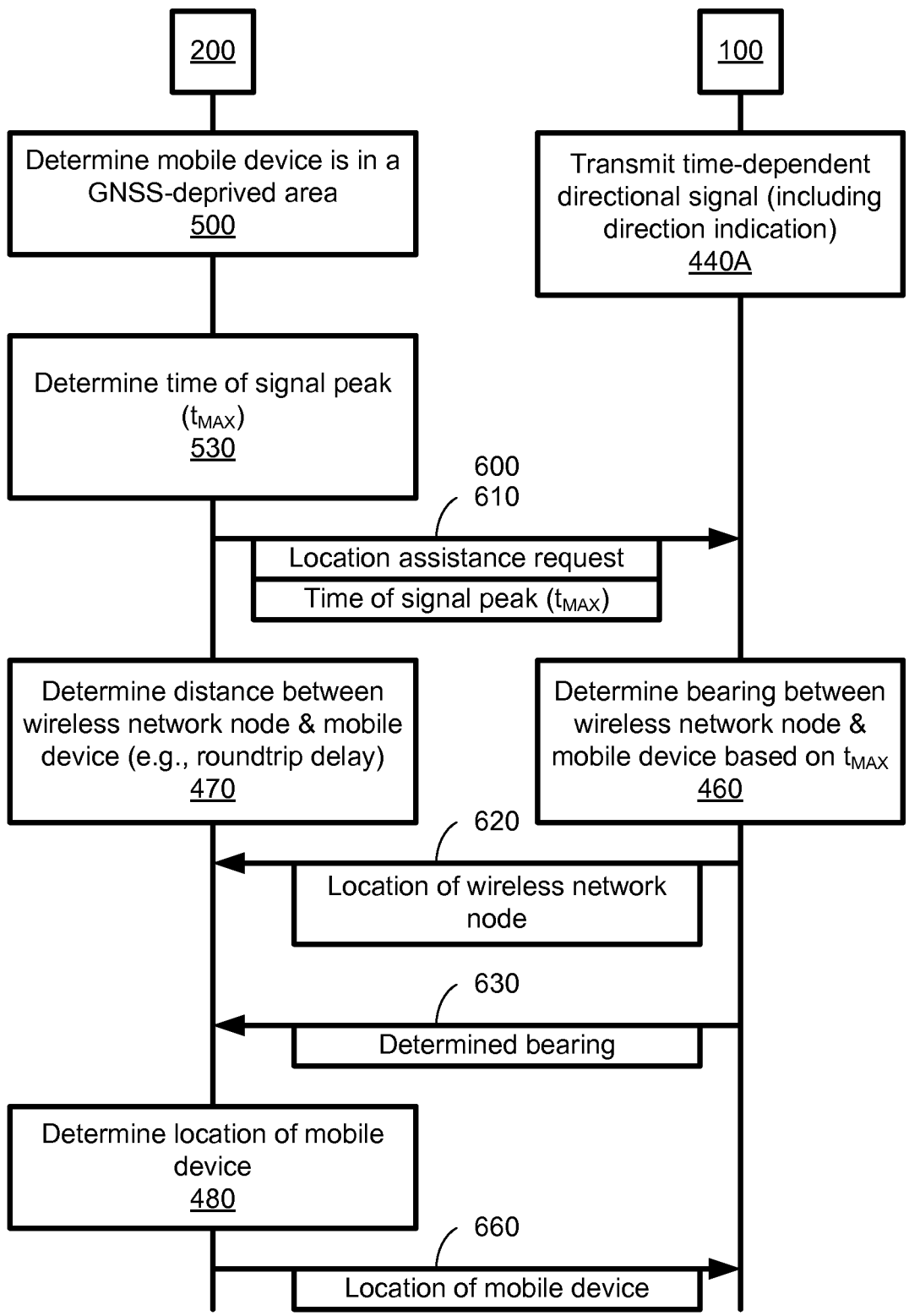

In FIG. 16C, the wireless network node 100 determines a bearing from the wireless network node 100 to the mobile device 200 based on a peak time measurement from the mobile device 200. In addition, the mobile device 200 determines a distance between the wireless network node 100 and the mobile device 200, and determines its location based on a location of the wireless network node 100.

At 500, the mobile device 200 determines it is in a GNSS-deprived area. At 440A, the wireless network node 100 transmits a directional signal 30. The wireless network node 100 transmits independently from receiving a message from a mobile device 200.

At 530, the mobile device 200 receives the directional signal 30 as received signal 40 and determines a time $t_{MAX}$ when a peak occurs in the received signal 40. The mobile device 200 sends a location assistance request message 600 to the wireless network node 100. The mobile device 200 also sends the determined time $t_{MAX}$ to the wireless network node 100 as message 610. In some embodiments, messages 600 and 610 are combined into a single message.

At 460, the wireless network node 100 determines a bearing from the wireless network node 100 to the mobile device 200 based on the determined time $t_{MAX}$. At 470, the mobile device 200 determines a distance d between the wireless network node 100 and the mobile device 200. In message 620, the wireless network node 100 sends its location to the mobile device 200. In message 630, the wireless network node 100 also sends the determined bearing to the mobile device 200. Messages 620 and 630 may be a signal message with multiple parameters.

At 480, the mobile device 200 determines the location of the mobile device 200 based on the determined bearing and determined distance. In some embodiments, the mobile device 200 sends the determined location to the wireless network node 100 in a message 660.

Figure 16D:
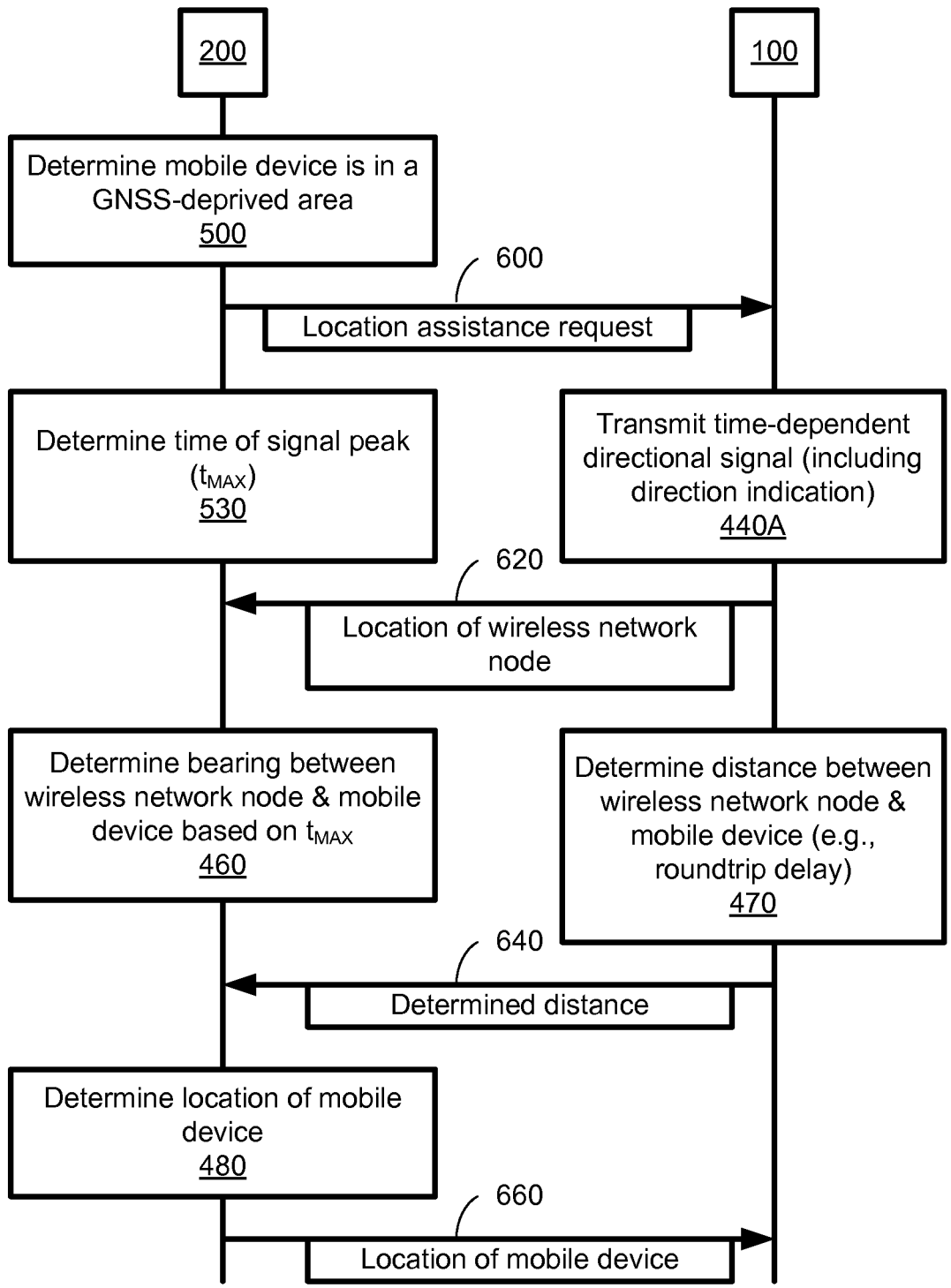

In FIG. 16D, the wireless network node 100 determines a distance between the wireless network node 100 and the mobile device 200, and the mobile device 200 determines a bearing and its location.

At 500, the mobile device 200 determines it is in a GNSS-deprived area. The mobile device 200 sends a location assistance request message 600 to the wireless network node 100. At 440A, the wireless network node 100 transmits a directional signal 30. At 530, the mobile device 200 receives the directional signal 30 as received signal 40 and determines a time $t_{MAX}$ when a peak occurs in the received signal 40. The mobile device 200 sends the determined time $t_{MAX}$ to the wireless network node 100 as message 610. In some embodiments, messages 600 and 610 are combined into a single message.

At 460, the mobile device 200 determines a bearing from the wireless network node 100 to the mobile device 200 based on the received signal 40 and the direction information. At 470, the wireless network node 100 determines a distance d between the wireless network node 100 and the mobile device 200. The wireless network node 100 sends this determined distance to the mobile device 200 in message 640.

At 480, the mobile device 200 determines the location of the mobile device 200 based on the determined bearing and determined distance. In some embodiments, the mobile device 200 sends the determined location to the wireless network node 100 in a message 660.

The methods described above determine a location of a mobile device 200 based on interactions with as few as a single wireless network device 100 transmitting a directional signal 30. The mobile device 200 and the single wireless network device 100 communicate with one another in determining a location of the mobile device 200 based on: (1) a distance to the wireless network device 100; (2) a bearing between the mobile device 200 and the wireless network device 100; and (3) a location of the wireless network device 100.

FIGS. 17 and 18A-D illustrate applications of triangulation, in accordance with some embodiments of the present invention.

Figure 17:
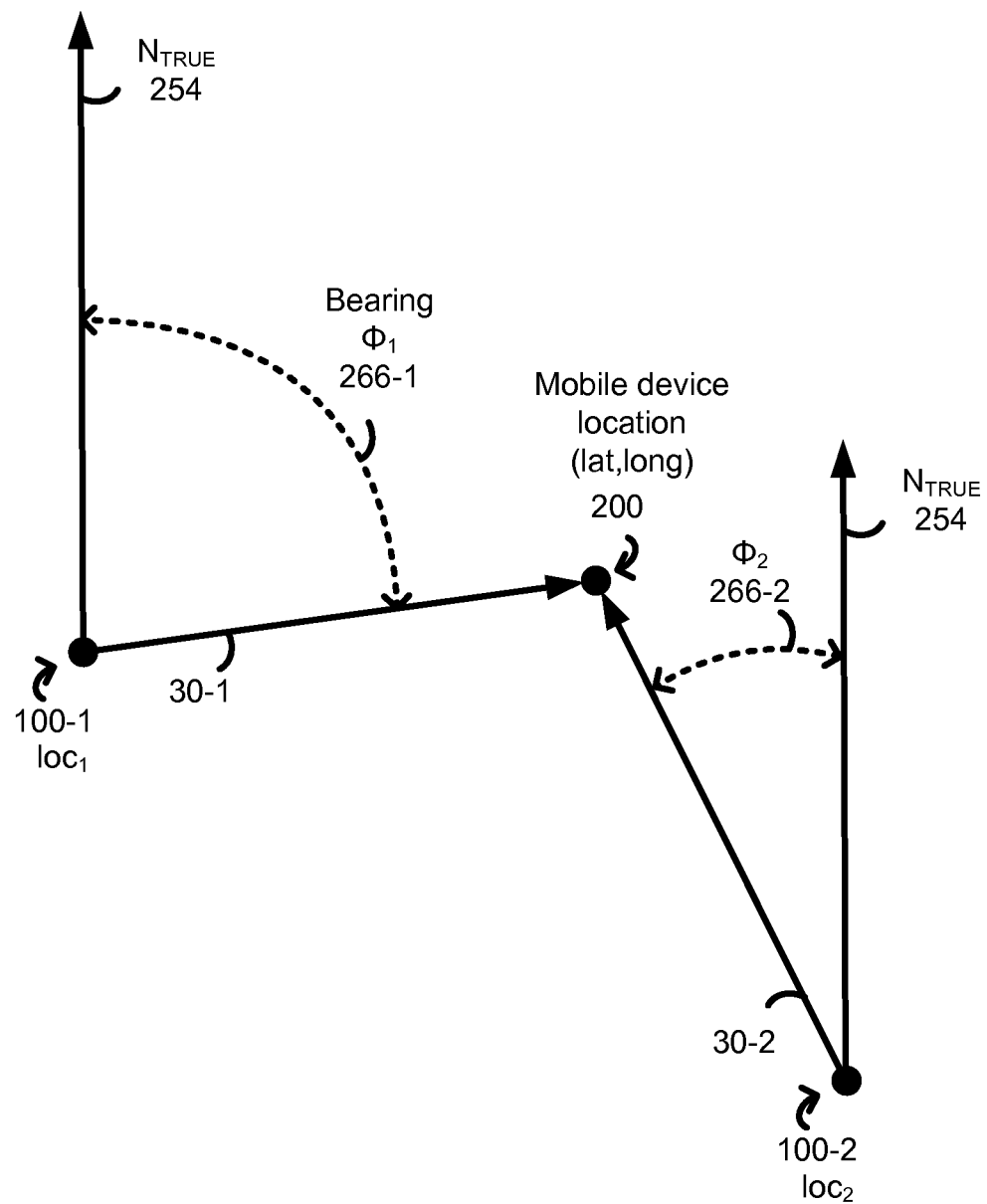
FIGS. 17 and 18A-D illustrate applications of triangulation, in accordance with some embodiments of the present invention.

FIG. 17 illustrates a method to determine a location of a mobile device 200 based on receiving directional signals 30 as received signals 40 from two wireless network devices 100-1, 100-2 each transmitting a directional signal 30-1, 30-2. The mobile device 200 may autonomously determine a location of the mobile device 200 based on: (1) a bearing 266-1 to a first of the two of wireless network devices 100-1; (2) a bearing 266-2 to a second of the two of wireless network devices 100-2; and (3) locations of the two of wireless network devices 100. Here, two wireless access devices 100-1, 100-2 are used to triangulate a location of a mobile device 200 based on two bearings 266-1, 266-2. When using two or more wireless network devices 100 within range of the mobile device 200, the mobile device 200 may be passive. When passive, the mobile device 200 determines its location based on only signals received. That is, the mobile device 200 may determine its location without transmitting messages to the wireless access devices 100.

In general, a mobile device 200 may determine its location based on bearings from and locations of a plurality of wireless network nodes 100. Each of the locations and bearing define a corresponding vector. An intersection of a these vectors identifies the location of the mobile device 200. As shown, each vector has a tail representing the location of the corresponding wireless network node 100, a head representing the location of the mobile device 200, and an angle representing the bearing 266 from the corresponding wireless network node 100 to the mobile device 200.

A process to determine a location of a mobile device 200 begins by obtaining the locations of the wireless network nodes 100. These locations may be broadcast on one or more overhead or broadcast channels. Alternatively, the locations may be stored in a table, preloaded or accessible by the prior to determining the location of the mobile device 200. Alternatively, the locations may be obtained after one or more or all of the bearings 266 are determined.

The processes to determine the location of the mobile device 200 continues by determining a bearing 266 from each of the plurality of wireless network node 100 to the mobile device 200. The bearing 266 may be determined as described above using a directional signal 30 and using one-way or roundtrip timing. For example, a first wireless network node 100-1 transmits a first directional signal 30-1 and a second wireless network node 100-2 transmits a second directional signal 30-2. These directional signals 30-1 and 30-2 may be synchronous or asynchronous with each other. Each transmitted directional signal 30 indicates the direction the signal is being transmitted at that moment either indirectly (e.g., predetermined formula) or directly (e.g., an announced direction) as described above. The mobile device 200 then determines bearings 266-1 and 266-1 of the corresponding transmitted directional signals 30-1 and 30-2 where the received signal 40 has corresponding maximum values. The transmitted signal may also include an identifier to identify and distinguish the wireless network nodes 100. For example, the identifier may be a node identifier, SSID, MAC address, serial number or the like.

The processes to determine the location of a mobile device 200 continues by determining an intersection of vectors formed from the obtained locations and the determined bearings. The mobile device 200 may form two or more vectors based on the locations (vector tails) and the bearings (vector angles 266) of each wireless network node 100. Next, the mobile device 200 determines a point of intersection of the vectors. This point represents the location of the mobile device 200. For example, if the mobile device 200 detects two wireless network nodes 100 from which it defines two vectors based on a location and bearing 266 for each wireless network node 100, the intersection of the two vectors will define a single point that represents the location of the mobile device 200. On the other hand, if the mobile device 200 detects three or more wireless network nodes 100 and defines a corresponding three or more vectors, the intersection of the vectors may not result in a single intersecting point but rather may define an area. In this case, the mobile device 200 may compute a point that provides a least mean squared (LMS) error. This LMS error point will represent the location of the mobile device 200. Alternately, in another embodiment, the mobile device may use the centroid of the defined area as its location.

Figure 18A:
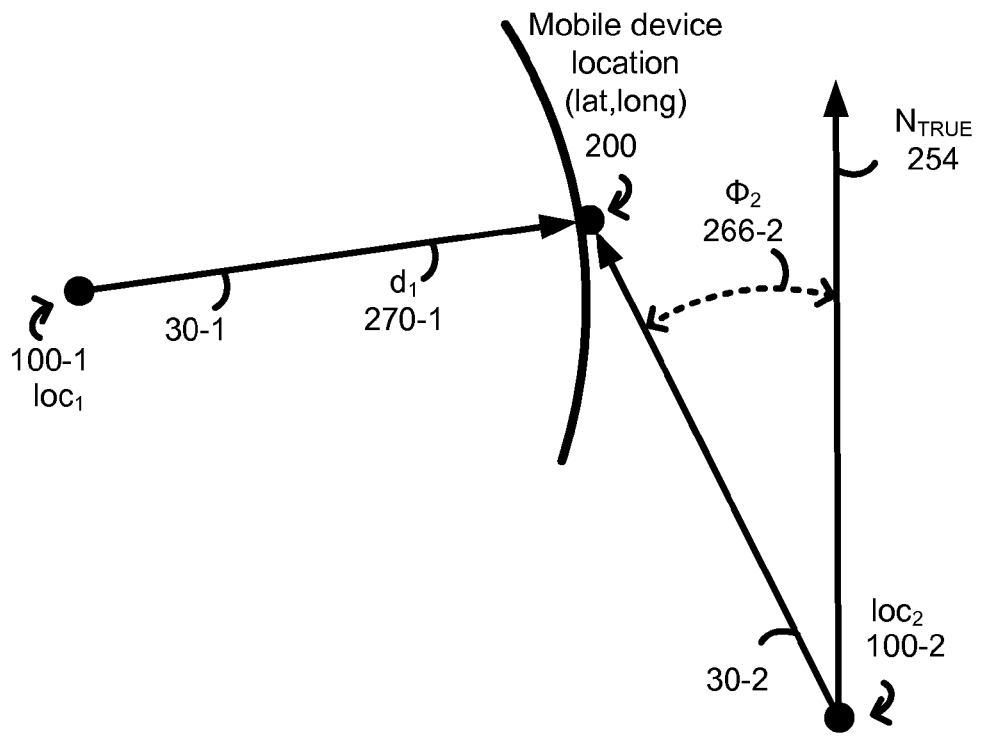

FIG. 18A illustrates a method to determine a location of a mobile device 200 based on received signals 40 from at least two wireless network devices 100 where at least one transmits a directional signal 30. The mobile device 200 may autonomously determine a location of the mobile device 200 based on: (1) a distance 270-1 to a first of the plurality of wireless network devices 100-1; (2) a bearing 266-2 between the mobile device 200 and a second of the plurality of wireless network devices 100-2; and (3) locations of the plurality of wireless network devices 100-1 and 100-2. The distance 270-1 may be determined as described above (e.g., based on a one-way or roundtrip signal delay). Also, the bearing 266-2 may be determined based on a directional signal 30, which may be a time-dependent signal and/or a direction-dependent signal as discussed above. Similarly, the locations of the wireless access devices 100 may be determined as discussed above.

In general, two or more wireless access devices 100 are used to triangulate a location of a mobile device 200 based on one or more bearings to one or more wireless access devices 100 and distances to one or more other wireless access devices 100. The mobile device 200 determines its location based on a vector formed by the bearing 266-2 from the second wireless access devices 100-2 and a circle formed around the first wireless access devices 100-1 where the circle has a radius equal to the distance 270-1.

Figure 18B:
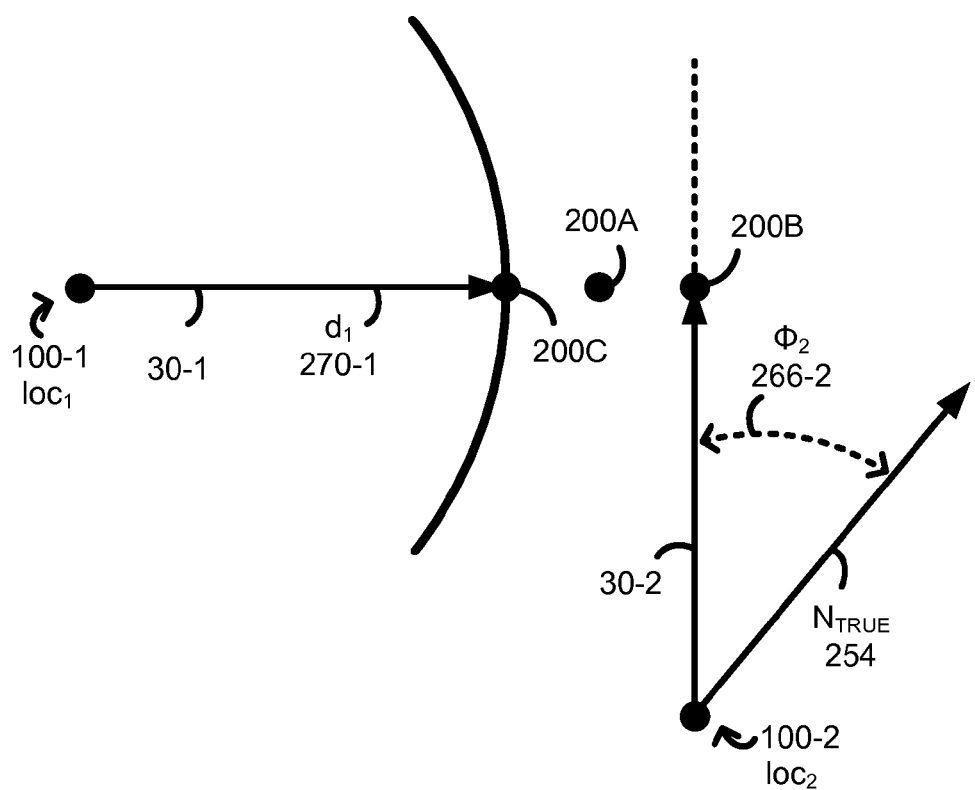

As shown in FIG. 18B, if the vector and circle do not intersect, a location of the mobile device 200 may be set to a point halfway along the shortest line perpendicular to the vector and perpendicular to the circle. This point is shown as 200A. In other embodiments, the location of the mobile device 200 will be on vector 30-2. This point is shown as 200B. In still other embodiments, the location of the mobile device 200 will be at the distance 270-1 at a point closest to the vector 30-2. This point is shown as 200C. Alternatively, if the vector and circle do not intersect, a location of the mobile device 200 may be set to a point along the shortest line perpendicular to the vector and perpendicular to the circle (a line formed from point 200B to 200C) weighted by the uncertain of the distance 270-1 and the uncertainty of the bearing 266-2. For example, if the bearing 266-2 has low uncertainty and this distance 270-1 has high uncertainty, the location of the mobile device 200 will be closer to vector 30-2.

Figure 18C:
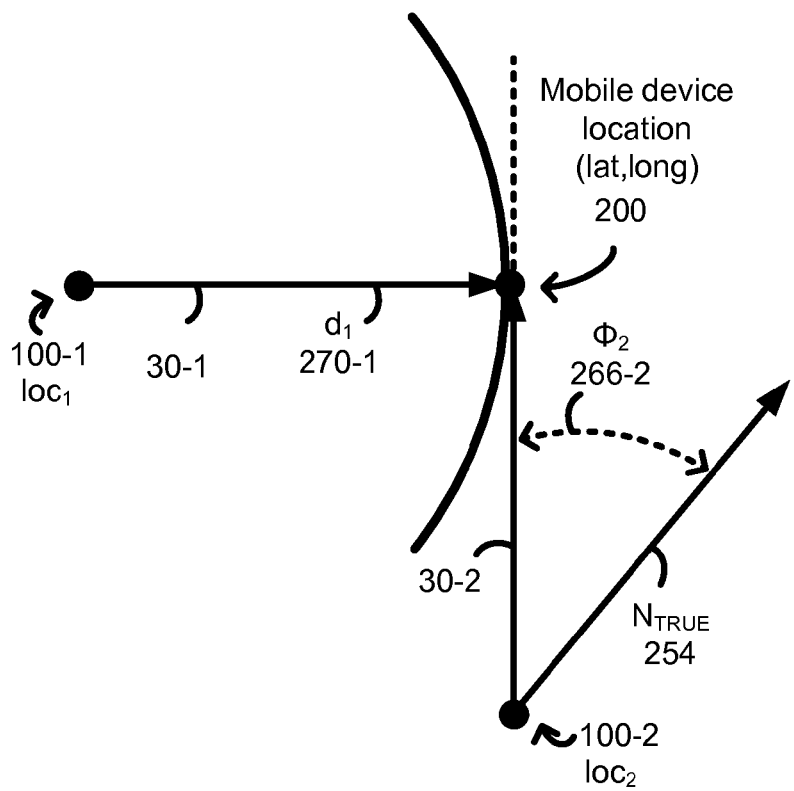

As shown in FIG. 18C, if the vector and circle intersect at a single point, a location of the mobile device 200 may be set to this intersecting point.

Figure 18D:
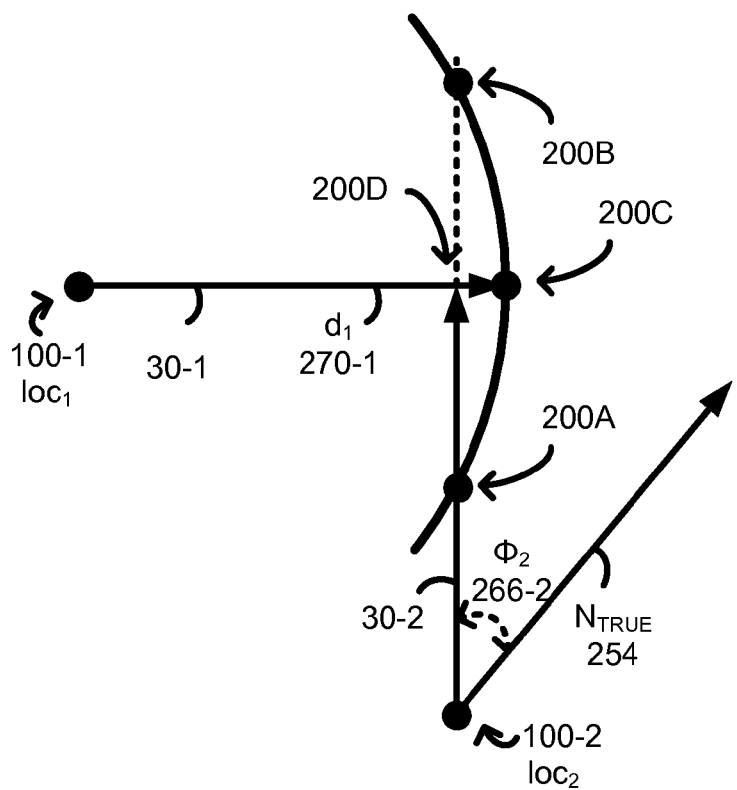

As shown in FIG. 18D, if the vector and circle intersect at two points, a location of the mobile device 200 may be set to the closer intersecting point (200A), the more distant intersecting point (200B), the point between the intersecting points at the distance 270-1 (200C), directly between the intersecting points (200D), a point halfway between 200C and 200D, or a point between 200C and 200D weighted by the uncertainty of the distance 270-1 and the uncertainty of the bearing 266-2. In some embodiments, indication may be provided regarding which method to use with a given wireless access device based upon the position of the wireless access device relative to structures.

The previous description of the disclosed aspects is provided to enable any person skilled in the art to make or use the present disclosure. Furthermore, the methods described above may be stored as program code on a computer-readable medium or in a device's memory as software instructions to perform the method. Various modifications to these aspects will be readily apparent to those skilled in the art, and the generic principles defined herein may be applied to other aspects without departing from the spirit or scope of the disclosure.

What is claimed is:

1. A method for determining a location of a mobile device, the method comprising:
 receiving, at the mobile device, a directional signal, wherein the directional signal is swept across various angles dependent upon time,
 determining a maximum among a plurality of sampled steps of the received directional signal at the mobile device at various times;
 determining a time ($t_{MAX}$) at which the maximum is received at the mobile device;
 converting the time ($t_{MAX}$) to a maximum body bearing value using a time reference and sweeping rate of the directional signal;
 determining a bearing by translating the body bearing using a plurality of predetermined rotational references; and
 determining a location of the mobile device based on the bearing.

2. The method of claim 1, further comprising sending, from the mobile device and to a wireless network node, a request to begin transmitting the directional signal.

3. The method of claim 2, further comprising determining the mobile device is in a GNSS-deprived area.

4. The method of claim 2, further comprising sending, from the mobile device and to the wireless network node, the time ($t_{MAX}$).

5. The method of claim 1, wherein the location of the mobile device comprises a latitude-longitude pair of the mobile device.

6. The method of claim 1, wherein determining the location of the mobile device is further based on a location of a wireless network node and further comprising receiving the location of the wireless network node.

7. The method of claim 6, wherein the bearing is between the wireless network node and the mobile device, and
 the act of determining the location of the mobile device is further based on the bearing.

8. The method of claim 1, wherein receiving the directional signal further comprises receiving an angle of transmission of the directional signal encoded in the directional signal.

9. The method of claim 6, further comprising determining a distance between the wireless network node and the mobile device.

10. The method of claim 1, further comprising determining a distance between a wireless network node and the mobile device, wherein the wireless network node and the mobile device have substantially synchronized clocks.

11. The method of claim 1, wherein the act of determining the location of the mobile device based on the bearing comprises:
 transmitting the bearing to a wireless network node; and
 receiving, from a wireless network node, the location of the mobile device computed based on the bearing.

12. The method of claim 1, wherein the act of determining the location of the mobile device based on the bearing comprises computing, at the mobile device, the location of the mobile device based on the bearing.

13. A mobile device, the device comprising:
 means for receiving, at the mobile device, a directional signal;
 wherein the directional signal is at least one of a directional signal swept across various angles dependent upon time, or a directional signal which announces an angle of transmission by having the angle encoded within the signal itself, or both;
 means for determining a maximum among a plurality of sampled steps at various times of the received directional signal at the mobile device;
 Means for determining a time ($t_{MAX}$) at which the maximum is received at the mobile device, and converting the time ($t_{MAX}$) to a maximum body bearing value using a time reference and sweeping rate of the directional signal;
 means for determining a bearing by translating the body bearing using a plurality of predetermined rotational references; and
 means for determining a location of the mobile device based on the bearing.

14. The mobile device of claim 13, further comprising means for determining a distance between the wireless network node and the mobile device.

15. A mobile device comprising a processor and a memory wherein the memory includes software instructions to:

receive, at the mobile device, a directional signal, wherein the directional signal swept across various angles dependent upon time, determine a maximum among a plurality of sampled steps of the received directional signal at the mobile device at various times;

determine a time ($t_{MAX}$) at which the maximum is received at the mobile device;

convert the time ($t_{MAX}$) to a maximum body bearing value using a time reference and sweeping rate of the directional signal;

determine a bearing by translating the body bearing using a plurality of predetermined rotational references; and determine a location of the mobile device based on the bearing.

16. A non-transitory computer-readable medium including program code stored thereon, comprising program code to:

receive, at the mobile device, a directional signal, wherein the directional signal swept across various angles dependent upon time, determine a maximum among a plurality of sampled steps of the received directional signal at the mobile device at various times;

determine a time ($t_{MAX}$) at which the maximum is received at the mobile device;

convert the time ($t_{MAX}$) to a maximum body bearing value using a time reference and sweeping rate of the directional signal;

determine a bearing by translating the body bearing using a plurality of predetermined rotational references; and determine a location of the mobile device based on the bearing.

* * * * *